US009120176B2

(12) United States Patent
Nishiyama et al.

(10) Patent No.: US 9,120,176 B2
(45) Date of Patent: Sep. 1, 2015

(54) LASER PROCESSING MACHINE AND LASER PROCESSING METHOD

(75) Inventors: Harumi Nishiyama, Kanagawa (JP);
Hiroshi Onodera, Kanagawa (JP);
Masaki Adachi, Kanagawa (JP);
Toshinori Abe, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 332 days.

(21) Appl. No.: 13/878,579

(22) PCT Filed: Oct. 21, 2011

(86) PCT No.: PCT/JP2011/074301
§ 371 (c)(1),
(2), (4) Date: Apr. 10, 2013

(87) PCT Pub. No.: WO2012/057025
PCT Pub. Date: May 3, 2012

(65) Prior Publication Data
US 2013/0193125 A1    Aug. 1, 2013

(30) Foreign Application Priority Data

Oct. 25, 2010  (JP) .................. 2010-238424

(51) Int. Cl.
*B23K 26/10* (2006.01)
*B23K 37/04* (2006.01)
(Continued)

(52) U.S. Cl.
CPC ............ *B23K 26/02* (2013.01); *B23K 26/0823* (2013.01); *B23K 26/0876* (2013.01);
(Continued)

(58) Field of Classification Search
CPC ................. B23K 26/10; B23K 37/04
USPC ............ 219/121.63–121.72, 121.82; 269/55, 269/56; 29/564
See application file for complete search history.

(56) References Cited

U.S. PATENT DOCUMENTS 4,867,427 A * 9/1989 Cunningham .................. 269/88
4,899,793 A * 2/1990 Snyder et al. ..................... 142/7
(Continued)

FOREIGN PATENT DOCUMENTS

JP  05-309490  11/1993
JP  07-080676  3/1995
(Continued)

OTHER PUBLICATIONS

International Search Report, mail date is Jan. 24, 2012.
(Continued)

*Primary Examiner* — Samuel M Heinrich
(74) *Attorney, Agent, or Firm* — Greenblum & Bernstein, P.L.C.

(57) ABSTRACT

A laser processing machine includes a work head, a plate-like work working table for processing a plate-like work, a rod-like work working table including a rod-like work holder for processing a rod-like work, and a work area in which the work head is movably provided. The plate-like work working table is provided movably from one side of the work area into the work area. The rod-like work working table is provided movably from another side of the work area into the work area that is opposite side of the one side. According to the laser processing machine, when switching over between a processing of a plate-like work and a processing of a rod-like work, it is needed only to move/evacuate the plate-like work working table and the rod-like work working table to/from the work area, so that the switching-over operation can be easily done.

10 Claims, 17 Drawing Sheets

(51) Int. Cl.
  *B23K 26/02* (2014.01)
  *B23K 26/08* (2014.01)
  *B23K 26/38* (2014.01)
  *B23K 37/02* (2006.01)
  *B23K 37/053* (2006.01)

(52) U.S. Cl.
  CPC ................ *B23K26/10* (2013.01); *B23K 26/38* (2013.01); *B23K 37/0235* (2013.01); *B23K 37/04* (2013.01); *B23K 37/0435* (2013.01); *B23K 37/0533* (2013.01); *B23K 2201/10* (2013.01); *B23K 2201/28* (2013.01); *B23K 2203/04* (2013.01)

(56) References Cited

U.S. PATENT DOCUMENTS

| | | | |
|---|---|---|---|
| 5,637,243 | A | 6/1997 | Sato et al. |
| 5,756,961 | A | 5/1998 | Sato et al. |

FOREIGN PATENT DOCUMENTS

| | | |
|---|---|---|
| JP | 07-148591 | 6/1995 |
| JP | 07-148592 | 6/1995 |
| JP | 10-058182 | 3/1998 |
| JP | 10-099985 | 4/1998 |
| JP | 10-175086 | 6/1998 |
| JP | 10-296358 | 11/1998 |
| JP | 2001-150175 | 6/2001 |
| JP | 2006-026758 | 2/2006 |
| JP | 2010-12479 | 1/2010 |
| JP | 2010-201465 | 9/2010 |

OTHER PUBLICATIONS

Japan Office action, mail date is Jul. 1, 2014.

\* cited by examiner

LASER PROCESSING MACHINE AND LASER PROCESSING METHOD

TECHNICAL FIELD

The present invention relates to a laser processing machine and a laser processing method capable of working both of a plate-like work and a rod-like work.

BACKGROUND ART

A patent Document 1 listed below discloses a laser processing machine capable of working both of a plate-like work and a rod-like work. When working a pipe in the laser processing machine, a pipe hold unit for holding the pipe is attached to an end of a worktable. On the other hand, when working a panel, the pipe hold unit is removed from the worktable, and then laid on an extension bed disposed besides the worktable in order to get it away from working of the panel.

PRIOR ART DOCUMENT

Patent Document

Patent Document 1: Japanese Patent Application Laid-Open No. 2001-150175

SUMMARY OF INVENTION

Problems to be Solved by the Invention

In the above laser processing machine, burdensome operations of attaching/removing the pipe hold unit to/from the worktable are needed when switching over between a processing of a plate-like work and a processing of a rod-like work, so that improvement is desired.

It is an object to provide a laser processing machine and a laser processing method that can easily switch over between working of a plate-like work and working of a rod-like work.

Means for Solving the Problem

A first aspect of the present invention provides a lased processing machine that includes a work head; a plate-like work working table for processing a plate-like work; a rod-like work working table including a rod-like work holder for processing a rod-like work; and a work area in which the work head is movably provided, wherein the plate-like work working table is provided movably from one side of the work area into the work area, and the rod-like work working table is provided movably from another side of the work area into the work area, the other side being opposite side of the one side.

A second aspect of the present invention provides a lased processing method, wherein a plate-like work working table is provided movably from one side of an work area in which a work head is provided into the work area, and a rod-like work working table including a rod-like work holder is provided movably from another side of the work area into the work area, the other side being opposite side of the one side. The method comprises; when processing a rod-like work, evacuating the plate-like work working table outside the work area, and moving the rod-like work working table to the work area, carrying-in the rod-like work on the rod-like work working table moved to the work area, processing the rod-like work on the rod-like work working table, and carrying-out the processed rod-like work to a carrying-out/in support plate placed on the plate-like work working table.

According to the above first aspect or the second aspects, when switching over between a processing of a plate-like work and a processing of a rod-like work, it is needed only to move/evacuate the plate-like work working table and the rod-like work working table to/from the work area, so that the switching-over operation can be easily done.

DESCRIPTION OF EMBODIMENTS

Hereinafter, a laser processing machine (a laser processing method) according to an embodiment will be explained with reference to the drawings.

Figure 1:
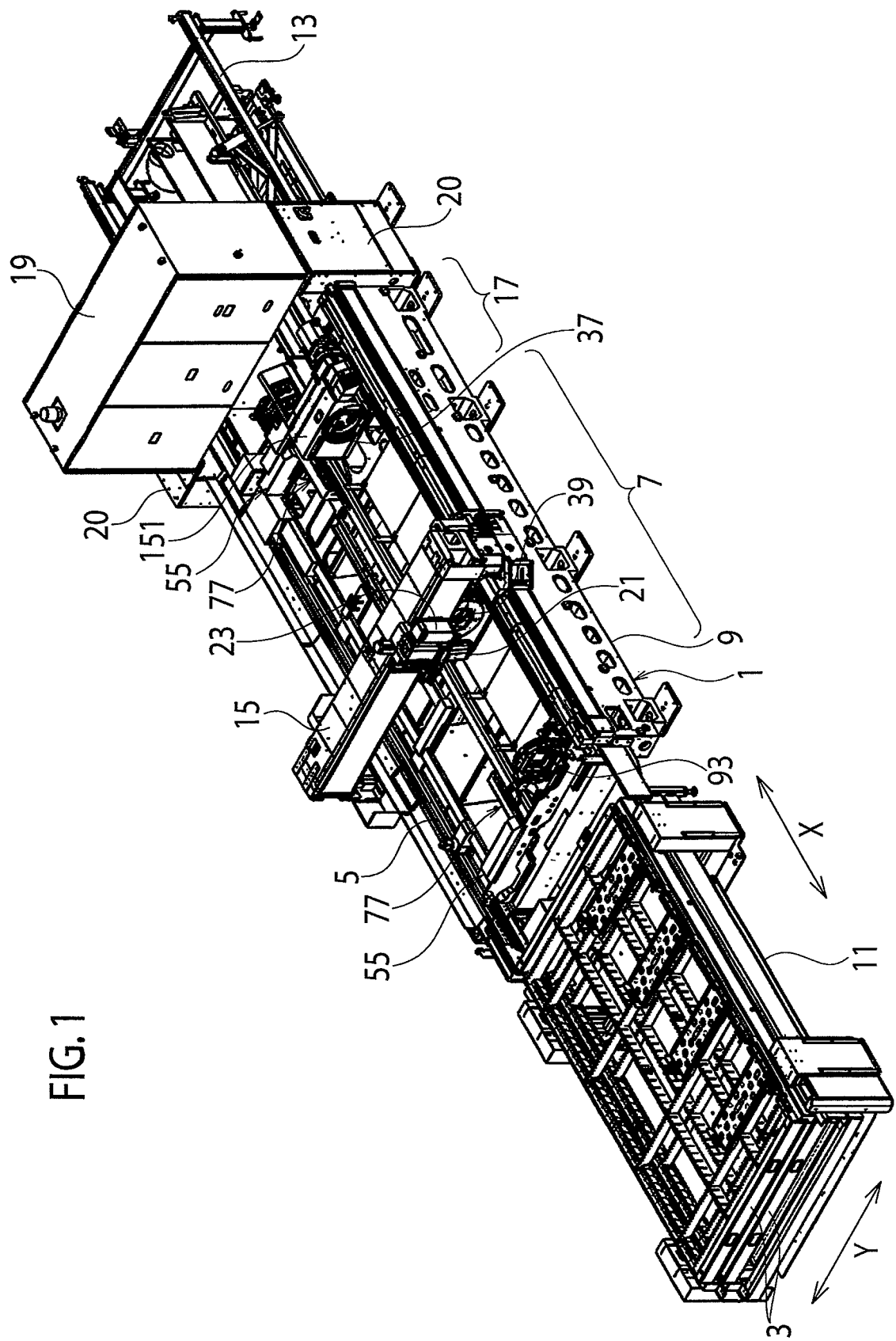
FIG. 1 It is a perspective view showing a laser processing machine according to a first embodiment (when working a pipe).

As shown in FIG. 1, the laser processing machine according to the present embodiment includes a base frame 1 formed long along an X-axis direction. First palettes (plate-like work working tables) 3 and a second palette (rod-like work working table) 5 are provided movably along a longitudinal direction of the base frame 1. Note that the second palette 5 is set at a working area 7 on the base frame 1, and the first palettes 3 are evacuated away from the working area 7.

The base frame 1 includes a main frame 9 locating at the working area 7, a carrying-out/in frame 11 disposed one side of the main frame 9, and a supplemental frame 13 disposed on another side. The frames 9, 11 and 13 are aligned on a straight line along the X-axis direction.

The plural first palettes 3 are stacked vertically-movably on the carrying-out/in frame 11. The first palette 3 whose vertical position has been set out relatively to the main frame 9 can be inserted-to or evacuated-from the working area 7 on the main frame 9.

The main frame 9 includes an evacuation area 17 for an after-explained X-axis carriage (head support portion) 15 on one side of the working area 7 (a side of the supplemental frame 13: a right side in FIG. 1). A laser oscillator 19 is disposed on a side of supplemental frame 13 to the evacuation area 17. The laser oscillator 19 is disposed on support bases 20 disposed on both sides of the base frame 1 along its width direction (a Y-axis direction). Below the laser oscillator 19, formed is a movable space in which the second palette 5 can move along the X-axis direction between the main frame 9 and the supplemental frame 13.

An X-axis carriage 15 having a work head 21 is provided in the working area 7 movably along the X-axis direction relatively to the base frame 1 (main frame 9). The work head 21 is attached movably along the Y-direction to the X-axis carriage 15 extended in the Y-direction with interposing a Y-axis carriage 23.

Figure 2:
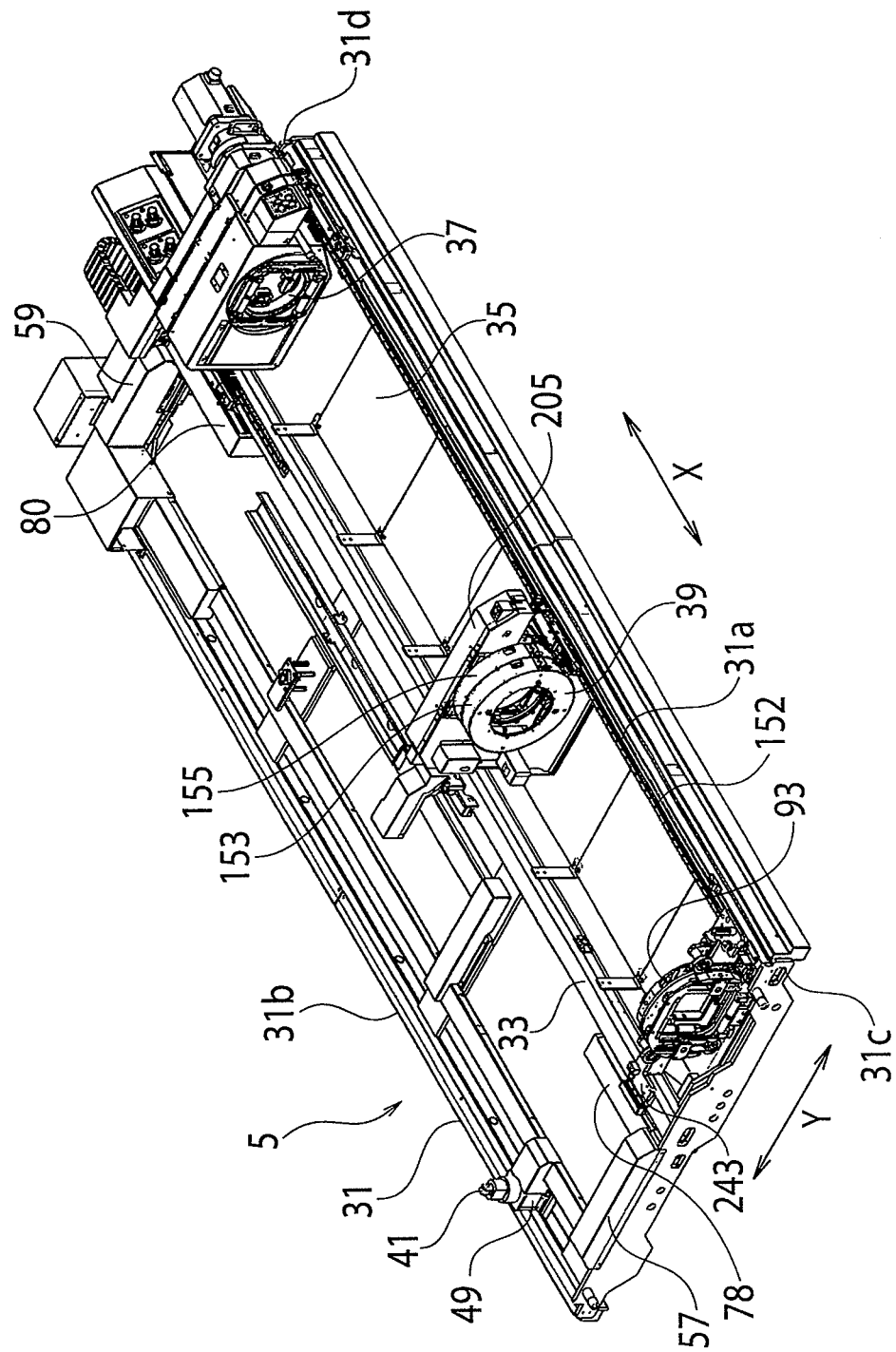
FIG. 2 It is a perspective view showing a second palette in the laser processing machine.

As shown in FIG. 2, the second palette 5 includes a rectangular outer frame 31, and an rod-like inner frame 33 extended along the X-axis direction at the almost center, along the Y-axis direction, of the outer frame 31. Bottom plates 35 are provided between the inner frame 31 and one of long frames 31a of the outer frame 31.

In an area where the bottom plates 35 are provided, a main chuck module 37 for holding a rod-like work (e.g. a long pipe) and a support chuck module 39 are provided along the long frame 31a and the inner frame 33 movably along the X-axis direction while guided by a guide rail 152. The main chuck module 37 and the support chuck module 39 constitute a part of a rod-like work holder. The second palette 5 including the rod-like work holder can enter-into/get-away-from the working area 7 on another side of the working area 7 (an opposite side of the above-explained one side: a side of the carrying-out/in frame 11: a left side in FIG. 1 or FIG. 2).

Traveling of the first palette 3 between the carrying-out/in frame 11 and the working area 7 (main frame 9) is done by a chain driven by a motor (not shown). On the other hand, traveling of the second palette 5 between the supplemental frame 13 and the working area 7 (main frame 9) is made by a drive force of the X-axis carriage 15 with which the second palette 5 is coupled.

Figure 3:
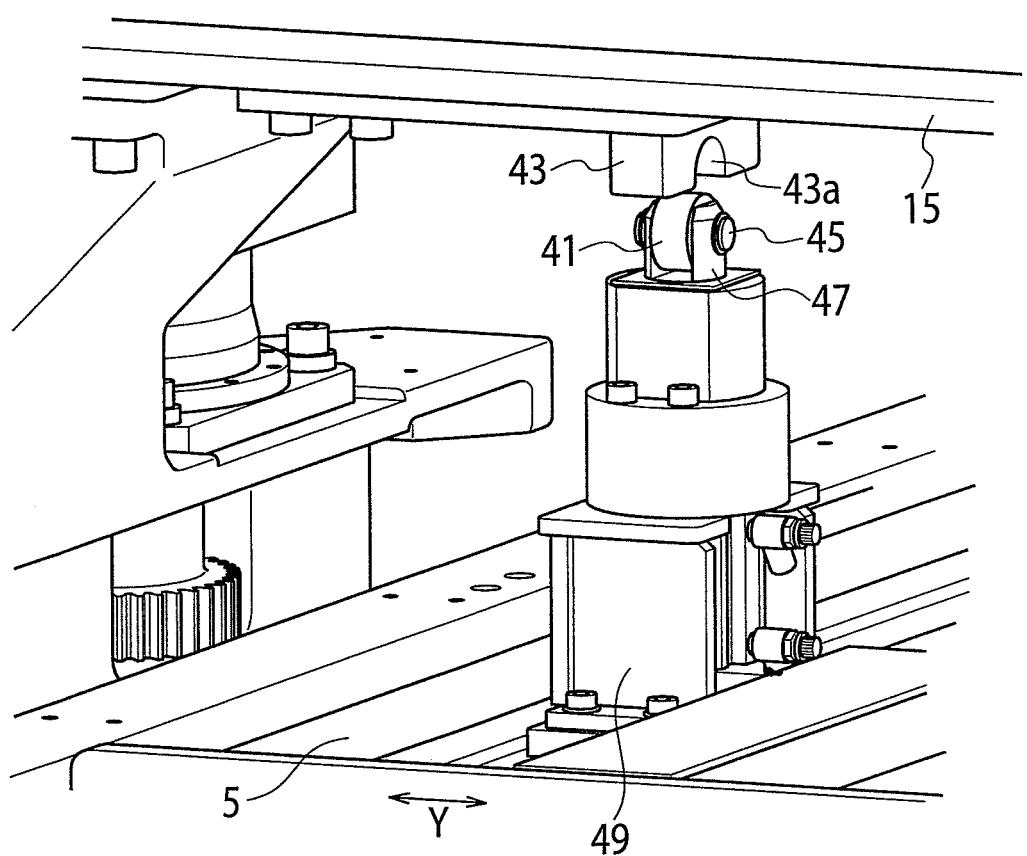
FIG. 3 It is a perspective view showing a coupling mechanism between an X-axis carriage and the second palette.

A coupling mechanism between the X-axis carriage 15 and the second palette 5 will be explained hereinafter. As shown in FIG. 3, the coupling mechanism has a configuration in which a coupling roller 41 provided on the second palette 5 is coupled with an almost semicircular-arc concave portion 43a of a coupling block 43 fixed on a bottom surface of the X-axis carriage 15. The coupling roller 41 is rotatably attached to an end (a top end) of a rod 47 capable of projecting upward via a support pin 45 whose axis extends in the Y-axis direction. The rod 47 can be moved vertically, by an elevating cylinder 49 fixed on the second palette 5, between a lower uncoupling position (a state shown in FIG. 3) and an upper coupling position for coupling the coupling roller 41 with the concave portion 43a. As shown in FIG. 2, the elevating cylinder 49 having the coupling roller 41 is attached to another of the long frames 31b of the outer frame 31 near the first palette 3.

The X-axis carriage 15 located at the escape area 17 (see FIG. 4(a)) is moved to the working area 7 in a state where the coupling roller 41 of the second palette 5 is coupled with the concave portion 43a of the X-axis carriage 15, and then set out (see FIG. 4(b)). This traveling is assured of required stop accuracy by servo driving. Note that, if over load happens during traveling/setting-out of the second palette 5 due to a problem, a thrust force of the X-axis carriage 15 in the X-axis direction exceeds more than a thrust force of the elevating cylinder 49 and thereby the coupling may uncoupled. The elevating cylinder 49 that has been uncoupled is detected, so that an alarm is raised based on the detection and the machine is stopped.

In addition, the second palette 5 is fixed with the main frame 9 (base frame 1) after properly traveled to the working area 7. A locking mechanism(s) between the main frame 9 and the second palette 5 will be explained hereinafter. In the present embodiment, two types of the locking mechanisms are provided. A first locking mechanism fixes the second palette 5 in two directions, the X-axis and Y-axis directions. As shown in FIG. 5(a), a positioning roller 51 provided on the second palette 5 is engaged with an almost semicircular-arc concave portion 53a of a fixing block 53 provided on the main frame 9. First locking modules 55 each having the positioning roller 51 are provided on the outer frame 31 on inner sides of short frames 31c and 31d (see FIG. 2), and disposed within covers 57 and 59 provided between the long frame 31b and the inner frame 33, respectively (the covers 57 and 59 hide the first locking modules 55 in FIG. 2). The fixing blocks 53 are disposed on the main frame 9 at positions associated with the first locking modules 55 at the time when the second palette 5 has been moved to its fixed position in the working area 7 (see FIG. 4(b)).

The positioning roller 51 is moved vertically by a locking cylinder 61 fixed on the second palette 5. As shown in FIG. 5(a) and FIG. 5(b), a positioning shaft 67 is connected with an end (a lower end) of a rod 63, capable of projecting downward, of the lock cylinder 61. The positioning shaft 67 strokes vertically while guided by a shaft guide 65. The positioning roller 51 is rotatably attached to an end (a lower end) of the positioning shaft via a rotational support pin 69 extending in the X-axis direction.

As shown in FIG. 5(a) to FIG. 5(c), a groove 51a is formed on an outer circumference of the positioning roller 51. Therefore, flanges 51b are formed on both sides of the groove 51a, respectively. Inner side-faces of the flanges 51b are formed as tapered faces 51t, respectively. On the other hand, the concave portion 53a of the fixing block 53 on the main frame 9 includes a semicircular-arc ridged portion 53a1. Outer side-faces of the ridged portion 53a1 are formed as tapered faces 53t, respectively.

Position of the second palette 5 is restricted along the two direction, the X-axis direction and the Y-axis direction, by the positioning roller 51 and the fixing block 53. Namely, as shown in FIG. 5(c), the position in the X-axis direction is restricted by the tapered faces 51t of the positioning roller 51 and the tapered faces 53t of the fixing block 53. On the other hand, as shown in FIG. 5(b), the position in the Y-axis direction is restricted by the groove 51a of the positioning roller 51 and the concave portion 53a of the fixing block 53.

In addition, a second locking mechanism for fixing the second palette 5 to the main frame 9 (base frame 1) restricts a vertical position (along a Z-axis direction) of the second palette 5 to restrict an uplift of the second palette 5. As shown in FIG. 6(a) to FIG. 6(c), a locking roller 73 is provided at an end of a locking lever 71 attached to the second palette 5. The locking roller 73 is engaged with a locking block 75 provided on the main frame 9. Second locking modules each having the locking lever 73 are provided within covers 78 and 80 on both ends, along the X-axis direction, of the inner frame 33 (see FIG. 2) of the second palette 5. (The covers 78 and 80 hide the second locking modules 77 in FIG. 2.) The locking blocks 75 are disposed on the main frame 9 at positions associated with the second locking modules 77 at the time when the second palette 5 has been moved to its fixed position in the working area 7 (see FIG. 4(b)).

A cylinder bracket 79 of the second locking module 77 is attached to the inner frame 33 of the second palette 5. A lock cylinder 81 is attached to the cylinder bracket 79. The cylinder bracket 79 includes a horizontal portion 79a and a vertical portion 79b that extends downward from one end (an end far from each of the short frames 31c and 31d) of the horizontal portion 79a, and has an almost L-shape when viewed from its side. A rear end of the lock cylinder 81 is pivotally attached to an inner lower portion of the vertical portion 79b via a support axial pin 83.

Piston rods 85 in a pair of the lock cylinders 81 are projected toward directions opposite to each other. A base end of the locking lever 71 is pivotally attached to each end of the piston rods 85 via a coupling axial pin 87. A pair of almost L-shaped lever supports 89 is attached to a bottom face of another end of the horizontal portion 79a of the cylinder bracket 79. Ends of the lever supports 89 is projected on a side opposite to the vertical portion 79b, and holds the almost center of the locking lever 71 rotatably via a rotational axial pin 91.

On the other hand, a locking recess 75a opened in a projected direction of the piston rod 85 and opened downward is formed on the locking block(s) 75. As shown in FIG. 6(c), the locking roller 73 provided at the end of the locking lever 71 is engaged with the locking recess 75a when the piston rod 85 is extended. At this time, the vertical position of the second palette 5 is restricted by the engagement of the locking rollers 73 and the locking blocks 75, so that an uplift of the second palette 5 due to an influence of curvature of a pipe or the like is restricted.

Figure 6:
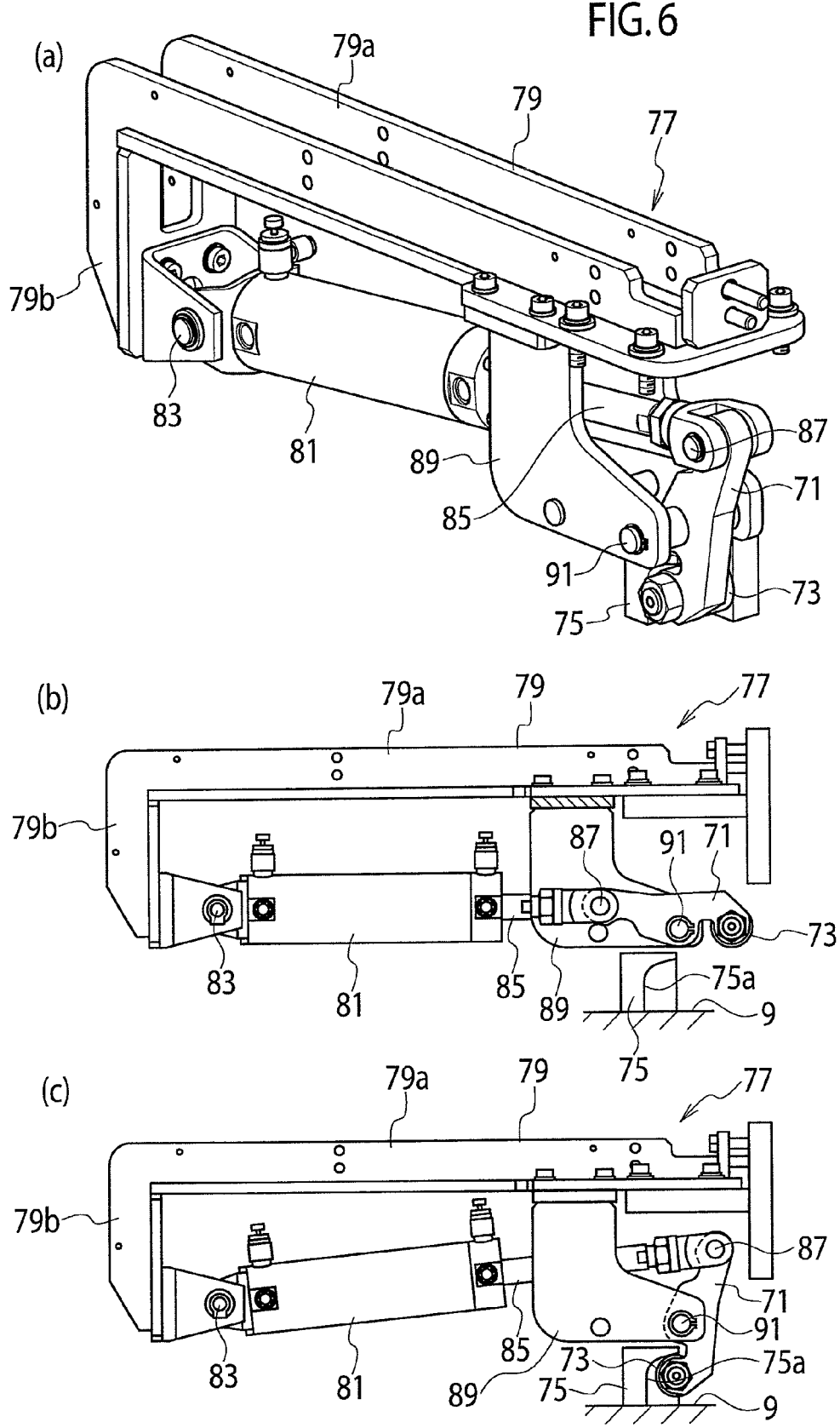
FIG. 6 It shows a second palette locking module for fixing the second palette with the work area, (a) is perspective view, (b) is a front view (unlock state), and (c) is a front view (lock state).

When the piston rod 85 is retracted from a lock state shown in FIG. 6 (c), the locking lever 71 rotates about the rotational axial pin 91 in the counterclockwise direction in the drawing. As a result, the locking roller 73 is disengaged from the locking recess 75a and thereby unlocked. The second locking modules 77 are unlocked and the first locking modules 55 are also unlocked in this manner, so that the second palette 5 can be moved relatively to the main frame 9.

Figure 4:
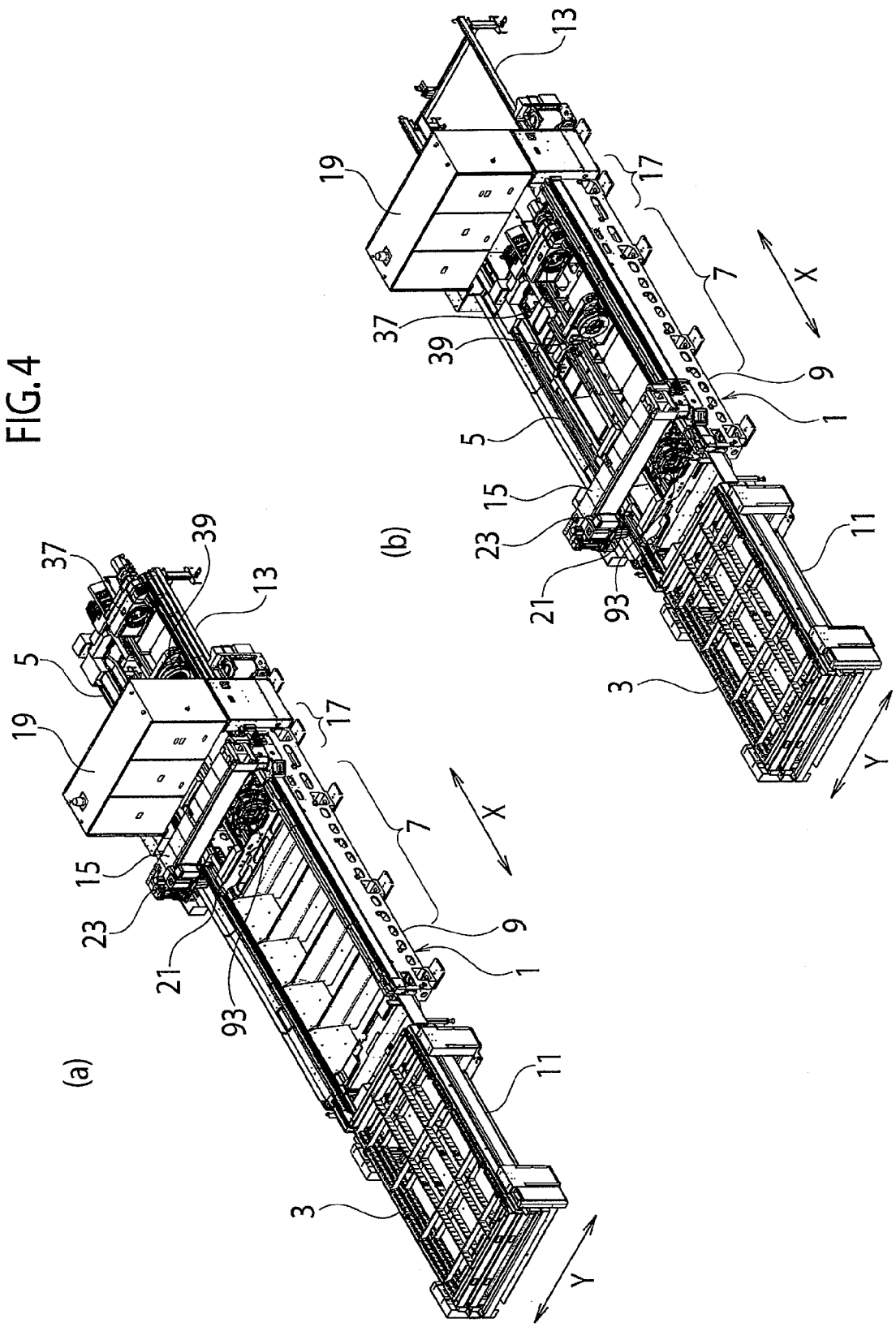
FIG. 4 It is an explanatory drawing showing a moving operation of the second palette from a supplemental frame to a work area of a main frame in an order (a) to (b).

The coupling roller 41 (see FIG. 3) is moved downward in a state shown in FIG. 4 (b) where the second palette 5 is fixed with the main frame 9 (base frame 1) by the first and second locking mechanisms and disengaged from the concave portion 43a of the X-axis carriage 15, so that coupling of the second palette 5 and the X-axis carriage 15 is uncoupled with each other. As a result, the X-axis carriage 15 having the work head 21 becomes movable relatively to the second palette 5 in the X-axis direction.

Next, the rod-like work holder provided on the second palette 5 will be explained. As shown in FIG. 2, the rod-like work holder includes a main chuck module 37, a support chuck module 39 positioned on a side of the carrying-in/out frame 11 to the main chuck module 37, and a product support module 93 positioned on a side of the carrying-in/out frame 11 to the support chuck module 39.

The main chuck module 37 constitutes a first holder that holds, when working a pipe (rod-like work), a vicinity of an end of the pipe. On the other hand, the support chuck model 39 can be coupled with the X-axis carriage 15 having the work head 21, and constitutes a second holder movable integrally with the work head 21 along the X-axis direction. In addition, the product support module 93 holds a worked pipe that has become a product. In the present embodiment, two of the product support modules 93 are provided along the X-axis direction (Only one of the product support modules 93 is shown in FIG. 2 and so on).

Figure 7:
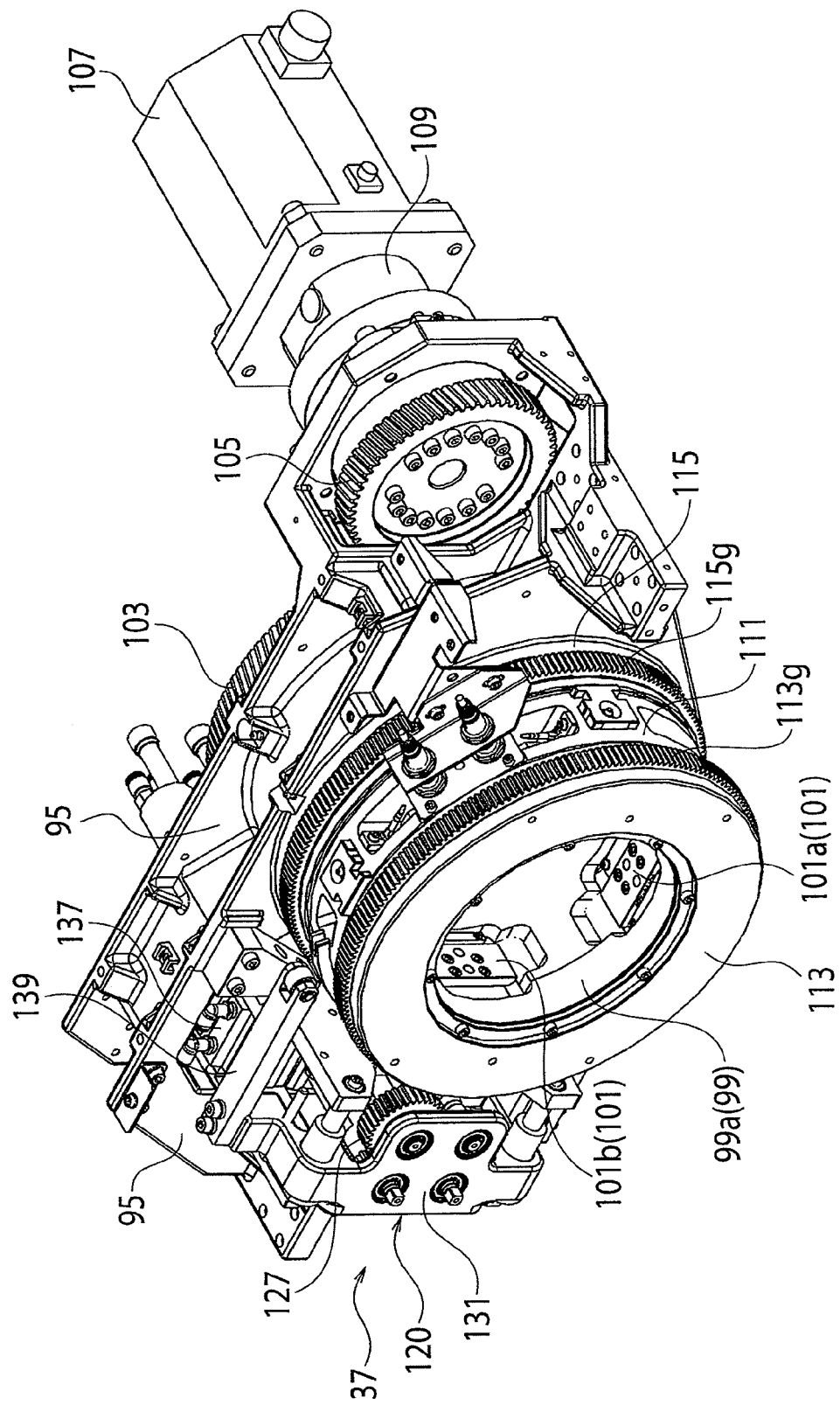
FIG. 7 It is a perspective view of a main chuck module provided on the second palette.
Figure 8:
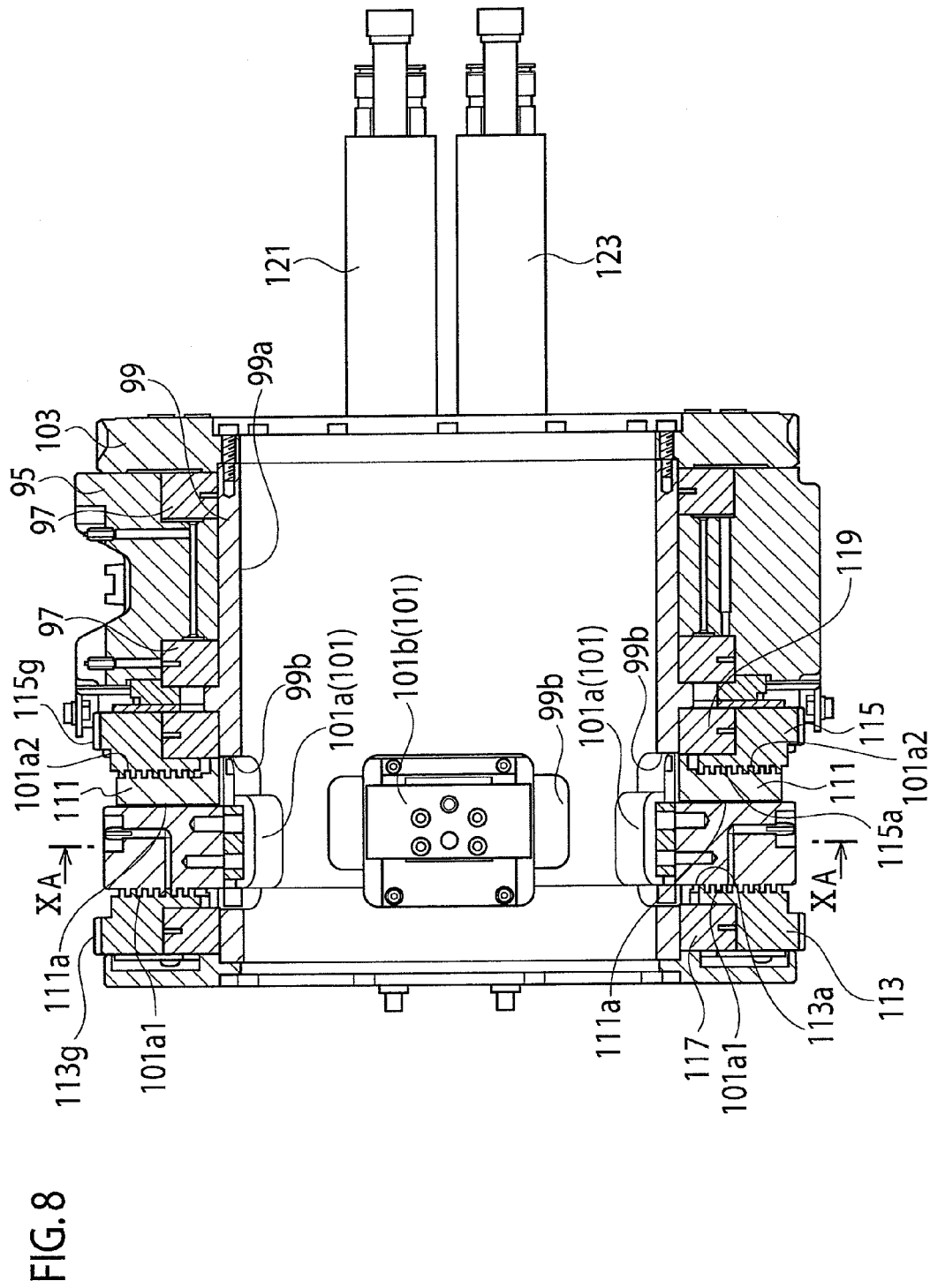
FIG. 8 It is a cross-sectional view of the main chuck module.

In the main chuck module 37, as shown in FIG. 7 and FIG. 8, a housing 95 holds a hollowed-cylindrical main shaft 99 rotatably via bearings 97. A pipe inserted into an insertion hole 99a within the main shaft 99 is held by after-explained jaws (holding members) 101.

The main shaft 99 includes a large gear 103 at its rear end (right end in FIG. 8), and the large gear 103 meshes with a small gear 105 (see FIG. 7). The small gear 105 is coupled with a servomotor 107 attached to the housing 95 via a speed reducer 109. Therefore, the large gear 103 is rotated via the speed reducer 109 and the small gear 105 when the servomotor 107 is driven, so that the main shaft 99 rotates.

The jaws 101 are constituted of a pair of vertical jaws 101a that face each other in the vertical direction and a pair of horizontal jaws 101b that face with each other in the horizontal direction, and four of them are provided in total along a circumferential direction of the main shaft 99. For these four jaws 101, a ring-shaped jaw guide 111 is attached to an outer circumference near a front end (left end in FIG. 8) of the main shaft 99. Each of the jaws 101 moves in a diameter direction while being guided by a guide hole 111 formed along the diameter direction on the jaw guide 111. Through holes 99b into which the jaws 101 are inserted are formed also on the main shaft 99.

Scroll ring boards 113 and 115 are disposed on both sides of the jaw guide 111, respectively. The scroll ring boards 113 and 115 are provided rotatably to the main shaft 99 via bearings 117 and 119. Outer circumferential gears 113g and 115g are formed on outer circumferences of the scroll ring boards 113 and 115, respectively. Spiral grooves 113a and 115a are formed on side faces, facing to the jar guide 111, of the scroll ring boards 113 and 115, respectively.

The spiral grooves 113a, on a front-end side of the main shaft 99, of the scroll ring board 113 mesh with meshing ridges 101a1 formed on surfaces of the two vertical jaws 101a facing to the scroll ring board 113. The meshing ridges 101a1 formed at intervals almost identical to intervals of the spiral grooves 113a along the diameter direction. Therefore, the two vertical jaws 101a are moved vertically (in the diameter direction) along the guide holes 111a of the jaw guide 111 by a rotation of the scroll ring board 113 while the meshing ridges 101a1 are guided by the spiral grooves 113a.

Similarly, the spiral grooves 115a, on a rear-end side of the main shaft 99, of the scroll ring board 115 mesh with meshing ridges 101a2 formed on surfaces of the two horizontal jaws 101b facing to the scroll ring board 115. The meshing ridges 101a2 formed at intervals almost identical to intervals of the spiral grooves 115a along the diameter direction. Therefore, the two horizontal jaws 101b are moved horizontally (in the diameter direction) along the guide holes 111a of the jaw guide 111 by a rotation of the scroll ring board 115 while the meshing ridges 101a2 are guided by the spiral grooves 115a.

Each of the spiral ring boards 113 and 115 are rotated by an air motors 121 or 123 of a drive assembly 120 (see FIG. 9) attached to the housing 95. Each rotational drive force of the air motors 121 and 123 is transmitted to the ring board drive gear 127/129 via a pinion gear 124a/125a of a pinion shaft 124/125. The ring board drive gear 127 and 129 can be contacted-with and separated-from the scroll ring boards 113 and 115, respectively. The ring board drive gear 127 and 129 mesh with the outer circumferential gears 113g and 115g when get close to the scroll ring boards 113 and 115.

The ring board drive gears 127 and 129, the pinion shafts 124 and 125 including the pinion gears 124a and 125a and the air motors 121 and 123 are assembled in a gear case 131. The gear case 131 is slidably attached to an assembly base 133 attached to the housing 95 via four linear guides 135. The gear case 131 can be contacted-with and separated-from the scroll ring boards 113 and 115 while being guided by the linear guides 135.

Figure 9:
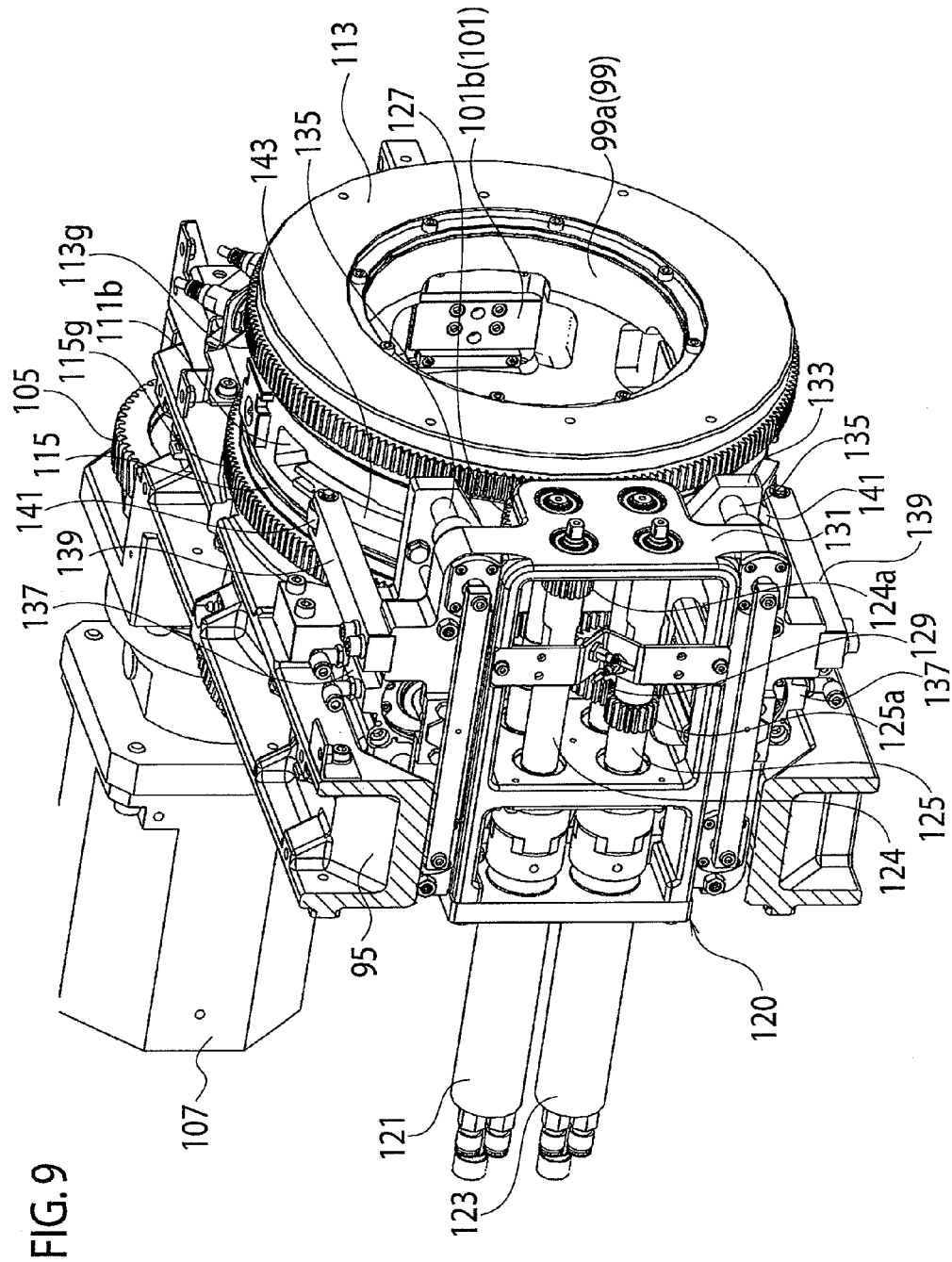
FIG. 9 It is a partially cut-out cross-sectional view of the main chuck module.

Sliding of the gear case 131 is done by a pair of cylinders 137 provided at upper and lower locations. The cylinders 137 are attached to the assembly base 133, and each of them can protrudes its piston rod to a direction opposite to the main shaft 99 as shown in FIG. 9. Ends of the piston rods are connected with the gear case 131.

Therefore, the gear case 131 is contacted-with and separated-from the scroll ring boards 113 and 115 by the cylinders 137, and, along with this, the ring board drive gears 127 and 129 are displaced between a meshed position and an unmeshed position with the scroll ring boards 113 and 115.

In addition, base ends of brake release bars 139 are fixed at upper and lower portions of the gear case 131, respectively. The release bars 139 are extended from the base ends toward an upper portion or a lower portion of the jaw guide 111, respectively. Roller followers 141 are rotatably attached to the ends of the release bars 139, respectively.

On the other hand, as shown in FIG. 9, a recess(es) 111b is formed on the outer circumference of the jaw guide 111 with associated with the brake release bar(s) 139. A brake lever(s) 143 is housed in the recess 111b. The brake lever(s) 143 has a curved shape almost corresponding to an outer circumferential shape of the jaw guide 111. The brake lever(s) 143 is swingably held by the jar guide 111 via a pin(s) 145 (see FIG. 10(a)) inserted from a side face of the jaw guide 111. The pin(s) 145 is located near an opposite end of the brake lever 143 to another end contacted with the brake release lever 139.

Figure 10:
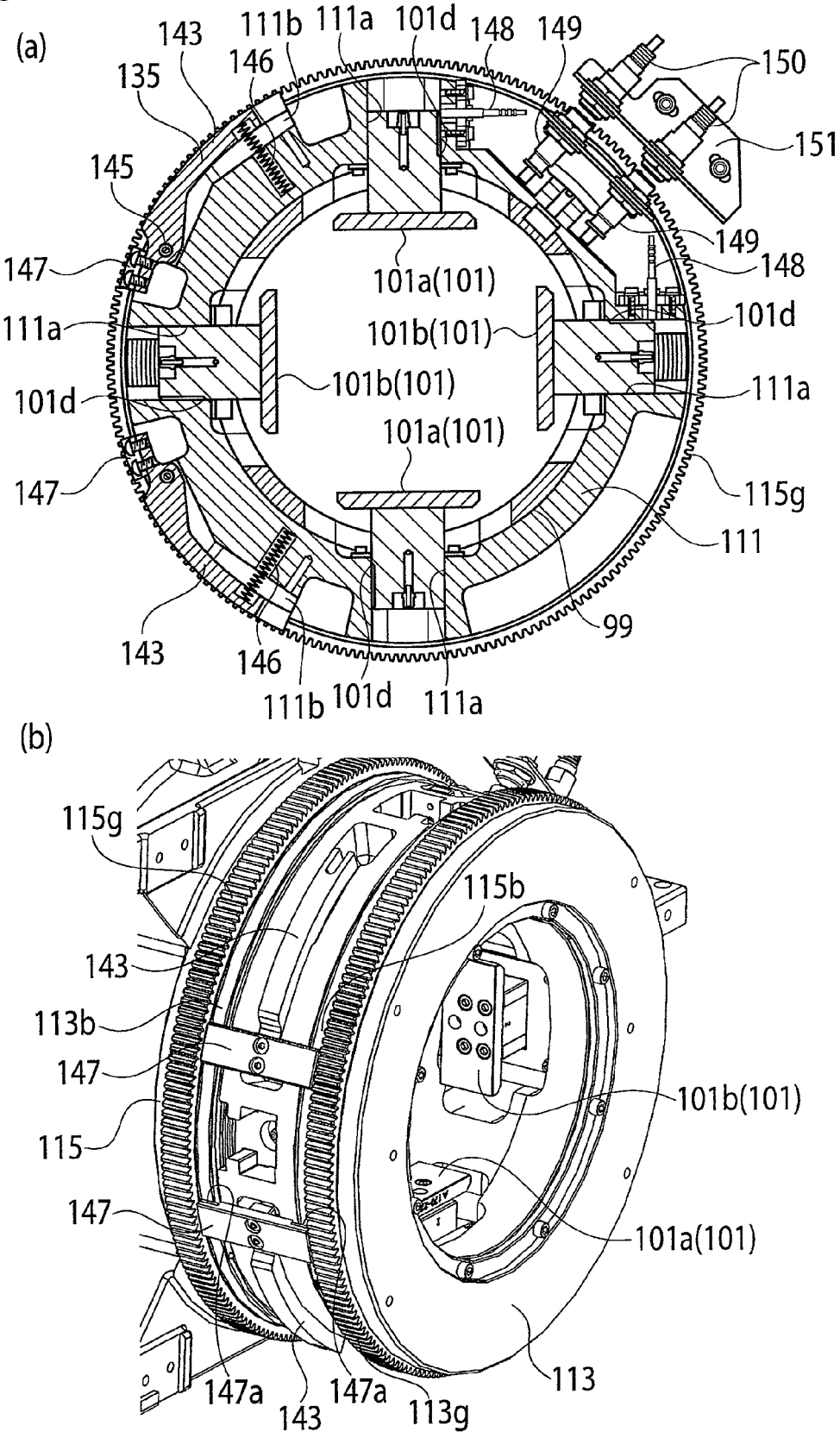
FIG. 10 (a) is a cross-sectional view taken along a line X-X in FIG. 8, and (b) is a perspective view of the main chuck module (its drive assembly is omitted).

As shown in FIG. 10(a) and FIG. 10 (b), the brake lever(s) 143 includes a brake pads 147 for restricting rotation of the scroll ring board 113 or 115 at the opposite end. The brake pad(s) 147 is positioned outward from the outer circumference of the jaw guide 111, and its pad faces 147a (side inner faces) are pressed onto outer circumferential faces 113b and 115b of the scroll ring boards 113 and 115 to restrict rotations of the scroll ring boards 113 and 115.

The brake lever(s) 143 is formed so that a length from the pin 145 to a contacting portion with the brake release bar 139 is made sufficiently longer than a length from the pin 145 to an attaching portion of the brake pad 147. Then, a compressed spring 146 housed in the recess 111b applies its elastic restoring force to the brake lever 143 on a side of the contacting portion with the brake release bar 139. As a result, the brake pads 147 are pressed onto the scroll ring boards 113 and 115 to restrict rotations of the scroll ring boards 113 and 115.

On the other hand, when the brake release bars 139 are moved, together with the gear case 131, toward the main shaft 99 in a state where rotations of the scroll ring boards 113 and 115 are restricted, the roller followers 141 become contacted with the brake levers 143. As a result, the brake levers 143 swing about the pins 145 and then the brake pads 147 are separated from the scroll ring boards 113 and 115. Namely, restriction of rotations of the scroll ring boards 113 and 115 is cancelled.

Therefore, in a state where the ring board drive gears 127 and 129 doesn't mesh with the outer circumferential gears 113g and 115g of the scroll ring board 113 and 115, rotations of the scroll ring board 113 and 115 are restricted by the brake pads 147. Namely, the jaw guide 111 and the scroll ring boards 113 and 115 can rotate integrally with each other. In addition, the main shaft 99 can also rotate integrally with the jaw guide 111 and the scroll ring boards 113 and 115 provided on its outer circumference at this time.

On the other hand, when the gear case 131 is moved to the main shaft 99 by driving of the cylinders 137, the ring board drive gears 127 and 129 become meshed with the scroll ring boards 113 and 115 and restriction of rotations of the scroll ring boards 113 and 115 is cancelled by the brake release bars 139. When the air motors 121 and 123 are driven in the state where the restriction of rotations is being cancelled, the scroll ring boards 113 and 115 are rotated via the ring board drive gears 127 and 129. As a result, the jaws 101 are moved along the diameter direction of the main shaft 99 by meshing of the spiral grooves 113a and 115a and the meshing ridges 101a1 and 101a2, and then a pipe W is held or released. When the ring board drive gears 127 and 129 are separated from the scroll ring boards 113 and 115 in the state where the pipe is being held by the four jaws 101, rotations of the scroll ring boards 113 and 115 becomes restricted again and the main shaft 99, the jaw guide 111 and the scroll ring boards 113 and 115 become rotatable integrally with each other. When the servomotor 107 is driven in this state, the pipe is rotated while being held in the inside of the main shaft 99.

Here, in a case to move the jaws 101 inward along the diameter direction, a holding force for the pipe is adjusted by adjusting supply pressures to the air motors 121 and 123. Conversely, in a case to move the jaws 101 outward along the diameter direction, the supply pressures to the air motors 121 and 123 are made higher because larger forces than holding forces are needed due to a wedge effect between the spiral grooves 113a and 115a and the meshing ridges 101a1 and 101a2 of the jaws 101a and 101b (meshing ridges on the jaws 101b are not shown in the drawings).

In addition, since the jaws 101 becomes hard to be closed due to the wedge effect when fully opened, plunger switches 148 for detecting fully-opened imminent positions of the jaws 101 are provided on the jaw guide 111 as shown in FIG. 10(a). Namely, when the plunger switches 148 detect the fully-opened imminent positions (step portions 101d) of the jaws 101, the air motors 121 and 123 are stopped to stop the jaws 101 at the fully-opened imminent positions. The detection signals of the plunger switches 148 are contactlessly detected by proximity switches 150 via transmission couplers 149, and than set to a controller of the air motors 121 and 123 that are drive sources of the jaws 101.

Here, the proximity switches 150 are attached to the housing 95 via a bracket 151. On the other hand, the plunger switches 148 and the transmission couplers 149 are attached to the jaw guide 111, and rotate together with the main shaft 99. Therefore, the detection by the proximity switches 150 can be done only at a position shown in FIG. 10(a). In addition, the plunger switches 148, the transmission couplers 149 and the proximity switches 150 are provided in two sets one of which are associated with the vertical jaws 101a and another of which are associated with the horizontal jaws 101b, and fully-opened imminent positions of the vertical jaws 101a and fully-opened imminent positions of the horizontal jaws 101b can be detected independently from each other.

Note that, as shown in FIG. 2, the main chuck module 37 having the above-explained configuration is attached to the guide rail 152 via the housing 95.

Next, the support chuck module 39 will be explained. As shown in FIG. 2, the support chuck module 39 includes a horizontal chuck 153 for holding a pipe horizontally, and a vertical chuck 155 for holding the pipe vertically. Since each of the chucks 153 and 155 has the same structure, the horizontal chuck 153 will be explained as a representative.

Figure 11:
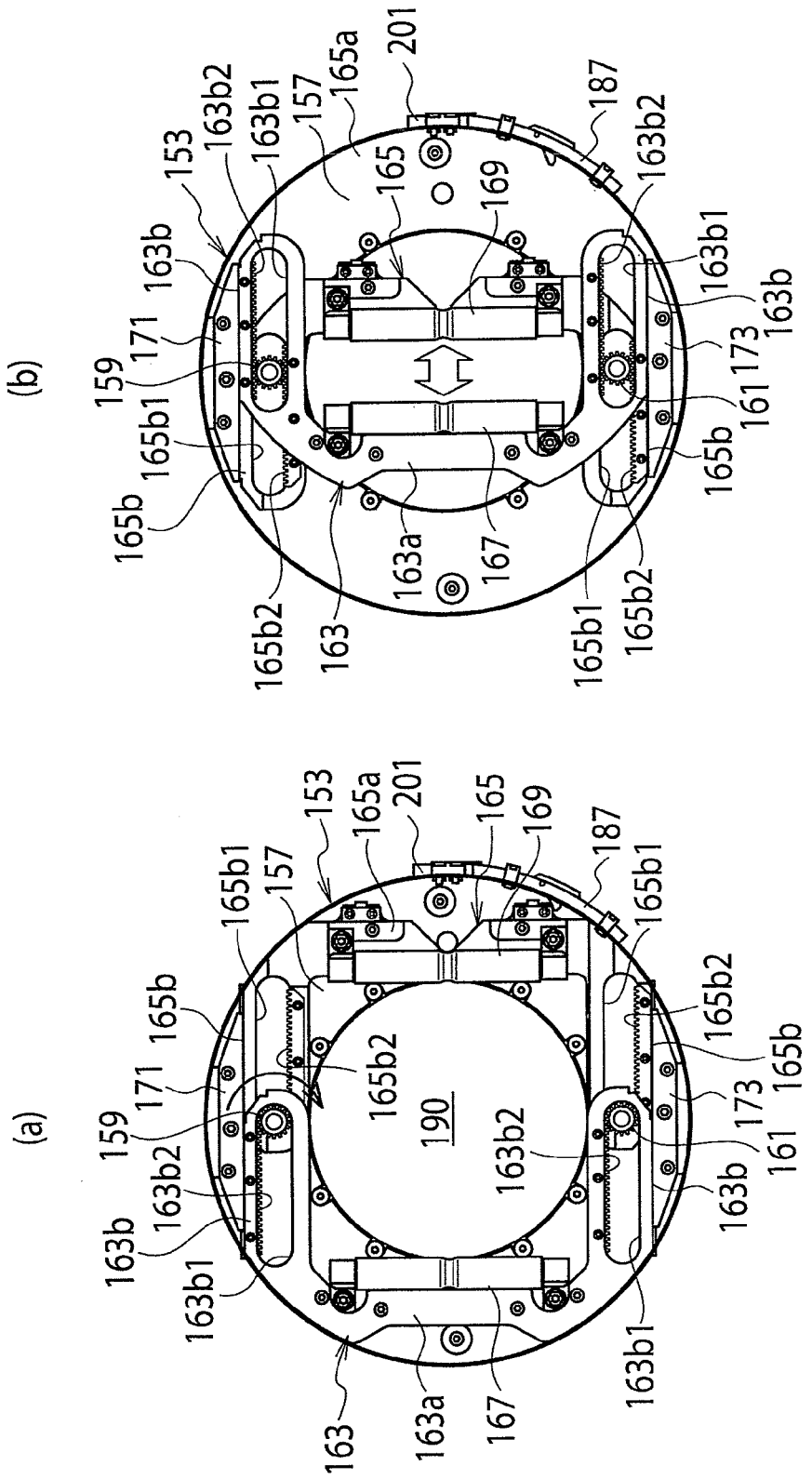
FIG. 11 It shows an internal configuration of a horizontal chuck provided in a support chuck module, (a) is a front view (rollers are opened), and (b) is a front view (the rollers are closed).

As shown in FIG. 11(a) and FIG. 11(b), in an internal structure of the horizontal chuck 153, pinion gears 159 and 161 are rotatably attached to an upper portion and a lower portion on a surface of a base plate 157 composed of a ring-shaped circular plate. In addition, U-shaped movable plates 163 and 165 that are moved in opposite horizontal directions to each other by rotations of the pinion gears 159 and 161 are attached to the base plate 157 symmetrically.

Each of the movable plate 163 and 165 includes a roller attached portion 163a/165a and power transmitting portions 163b/165b horizontally extended from upper and lower ends of the roller attached portion 163a/165a, respectively. Rollers 167 and 169 (a first roller group) each having an axis extending vertically are rotatably attached to the roller attached portions 163a and 165a, respectively. Elongated holes 163b1 and 165a1 horizontally elongated are formed on the power transmitting portions 163b and 165b, respectively.

Rack gears 163b2 meshing with the pinion gears 159 and 161 are formed on upper edges of the upper and lower elongated holes 163b1, respectively, and rack gears 165b2 meshing with the pinion gears 159 and 161 are also formed on lower edges of the upper and lower elongated holes 165b1. In addition, guide members 171 and 173 for guiding horizontal movements of the movable plates 163 and 165 are attached to the base plate 157.

Figure 12:
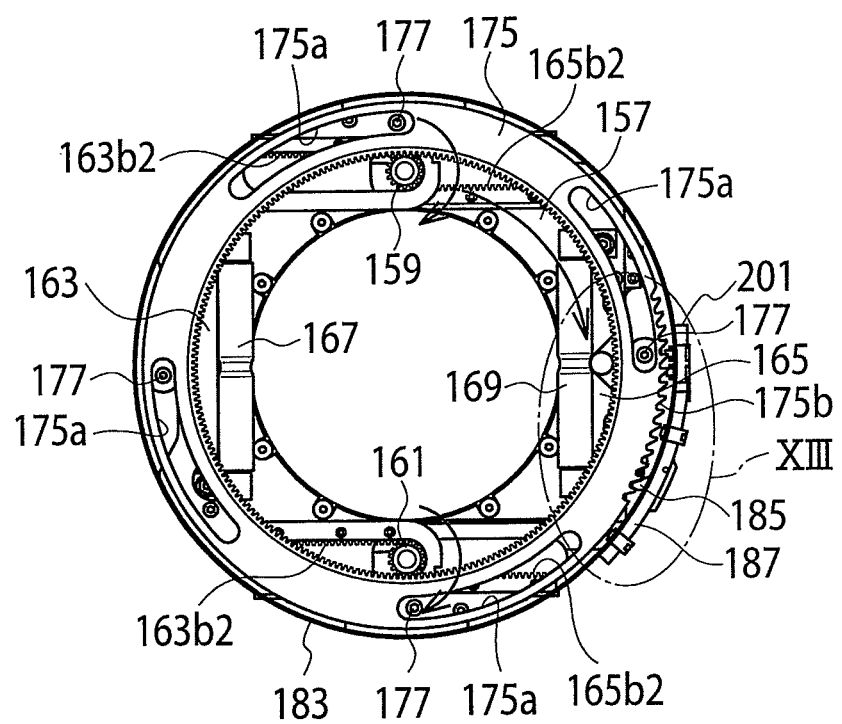
FIG. 12 It is a front view of the horizontal chuck to which an internal gear is attached.

Further, as shown in FIG. 12, an internal gear 175 is rotatably attached at an outer side of the movable plates 163 and 165 with its center coincided to the center of the base plate 157. Note that the internal gear 175 is not shown in FIG. 11(a) and FIG. 11(b). Four curved elongated holes 175a are formed on the internal gear 175 along its circumferential direction at even intervals, and guide pins 177 provided on the base plate 175 are inserted into the insides of the elongated holes 175a slidably, respectively.

The pinion gears 159 and 161 mesh also with the internal gear 175. Therefore, rotations of the two pinion gears 159 and 161 are synchronized by the internal gear 175. For example, when rotating the upper pinion gear 159 clockwise, the internal gear 175 is rotated clockwise and, in association with this, the lower pinion gear 161 is also rotated clockwise. Note that the pinion gear 159 is rotated by a tool in the present embodiment.

When the two pinion gears 159 and 161 rotates clockwise synchronously, the movable plates 163 and 165 including the rack gears 163b2 and 165b2 meshed with the pinion gears 159 and 161 are moved so as to get close to each other to be changed from a state shown in FIG. 11(a) (the rollers are opened) to a state shown in FIG. 11(b) (the rollers are closed). Therefore, the two rollers 167 and 169 provided on the movable plates 163 and 165 get close to each other to hold a pipe.

In this manner, the horizontal chuck 153 holds a pipe horizontally, but the vertical chuck 155 corresponds to one obtained by arranging the horizontal chuck 153 rotated by 90 degrees. Therefore, in the support chuck module 39, the horizontal chuck 153 holds a pipe horizontally and the vertical chuck 155 holds the pipe vertically, so that the pipe is held from four directions.

In addition, lock mechanisms for fixing positions of the rollers in a state where the pipe is held by the rollers are provided in the horizontal chuck 153 and the vertical chuck 155. Hereinafter, these lock mechanisms will be explained by taking the horizontal chuck 153 as representative.

External teeth 175b are formed along an outer circumference of the internal gear 175 near the roller 169 on a right side in FIG. 12. On the other hand, as shown in FIG. 13(a) and FIG. 13(b), hollowed cylinder 183 is provided along an outer circumferential edge of the base plate 157. A slide bar 187 including a lock key 185 is provided on an outer circumference of the hollowed cylinder slidably along a circumferential direction.

A ring-shaped cover (see FIG. 2) that covers over the internal gear 175 is attached to the hollowed cylinder 183. A case for covering mechanism provided within the cover such as the rollers 167 and 169 is constituted of the base plate 157, the hollowed cylinder 183 and the cover. Note that, since the base plate 157 and the cover are formed to have a ring-shape, the support chuck module 39 is provided with an insertion hole (a rod-like work insertion hole) 190 (see FIG. 11(a)) into which a pipe is inserted.

The slide bar 187 moves slidably along the circumferential direction between the outer circumference of the hollowed cylinder 183 and a pair of guides 191 and 193 fixed to the hollowed cylinder 183 by screws. A lock key accommodation hole 187a is formed at the almost center of longitudinal direction (the circumferential direction) of the slide bar 187. The lock key 185 is accommodated in the lock key accommodation hole 187a.

Then, the lock key 185 is swingably attached to the slide bar 187 via a pin 195. A locking portion 185a on an end of the lock key 185 swings between its unlock position (FIG. 13(a)) and its lock position (FIG. 13(b)). In addition, the lock key 185 is biased to its locking direction by a leaf spring 199 fixed to the slide bar 187 by screws in a cantilevered manner.

A pushing screw 201 for moving the slide bar 187 downward is disposed above the slide bar 187. The pushing screw 201 moves in a tangential direction of the hollowed cylinder 183 while being guided by a pushing screw guide 203 fixed on the outer circumference of the hollowed cylinder 183 by screws. In addition, as shown in FIG. 13(a), a through hole 183a is formed, near the lock key 185, on the hollowed cylinder 183. The locking portion 185a of the lock key 185 can be projected into the inside of the hollowed cylinder 183 through the through hole 183a.

Here, in the unlock state (FIG. 13(a)), the lock key 185 contacts with an edge of the through hole 183a, so that a projected amount of the locking portion 185a into the inside of the hollowed cylinder 183 is small and the locking portion 185a doesn't mesh with the external teeth 175b. When forwarding the slide bar 187 downward by rotating the pushing screw 201 from this state, the lock key 185 moves along the circumferential direction. At this time, the lock key 185 is rotated in a direction indicated by an arrow in the drawing by the leaf spring 199, so that its projected amount increases. As a result, the locking portion 185a mesh with the external teeth 175b and thereby the lock state (FIG. 13(b)) is brought.

The external teeth 175b is inclined in a direction opposite to the projected direction of the lock key 185. Therefore, when the external teeth 175b mesh with the lock key 185 as shown in FIG. 13(b), a counterclockwise rotation of the internal gear 175 in the drawing becomes restricted. When the internal gear 175 rotates counterclockwise, holding of a pipe by the rollers 167 and 169 is cancelled. Therefore, holding of a pipe by the rollers 167 and 169 is locked by restricting the counterclockwise rotation of the internal gear 175 via the internal gear 175, the pinion gears 158 and 161 and the rack gears 163*b*2 and 165*b*2 (the movable plates 163 and 165). When the pushing screw 201 is further tightened, a load along the circumferential direction is applied to the internal gear 175 and thereby forces for holding a pipe by the rollers 167 and 169 increase.

As explained above, according to the support chuck module 39, even when reactive forces from a pipe or centrifugal force caused by a rotation of a pipe are applied to the horizontal chuck 153 and the vertical chuck 155 under a state where the pipe is held by the chucks 153 and 155 (especially, during working the pipe), holding of the pipe is continuously ensured, and thereby high-accuracy workings can be made.

Figure 13:
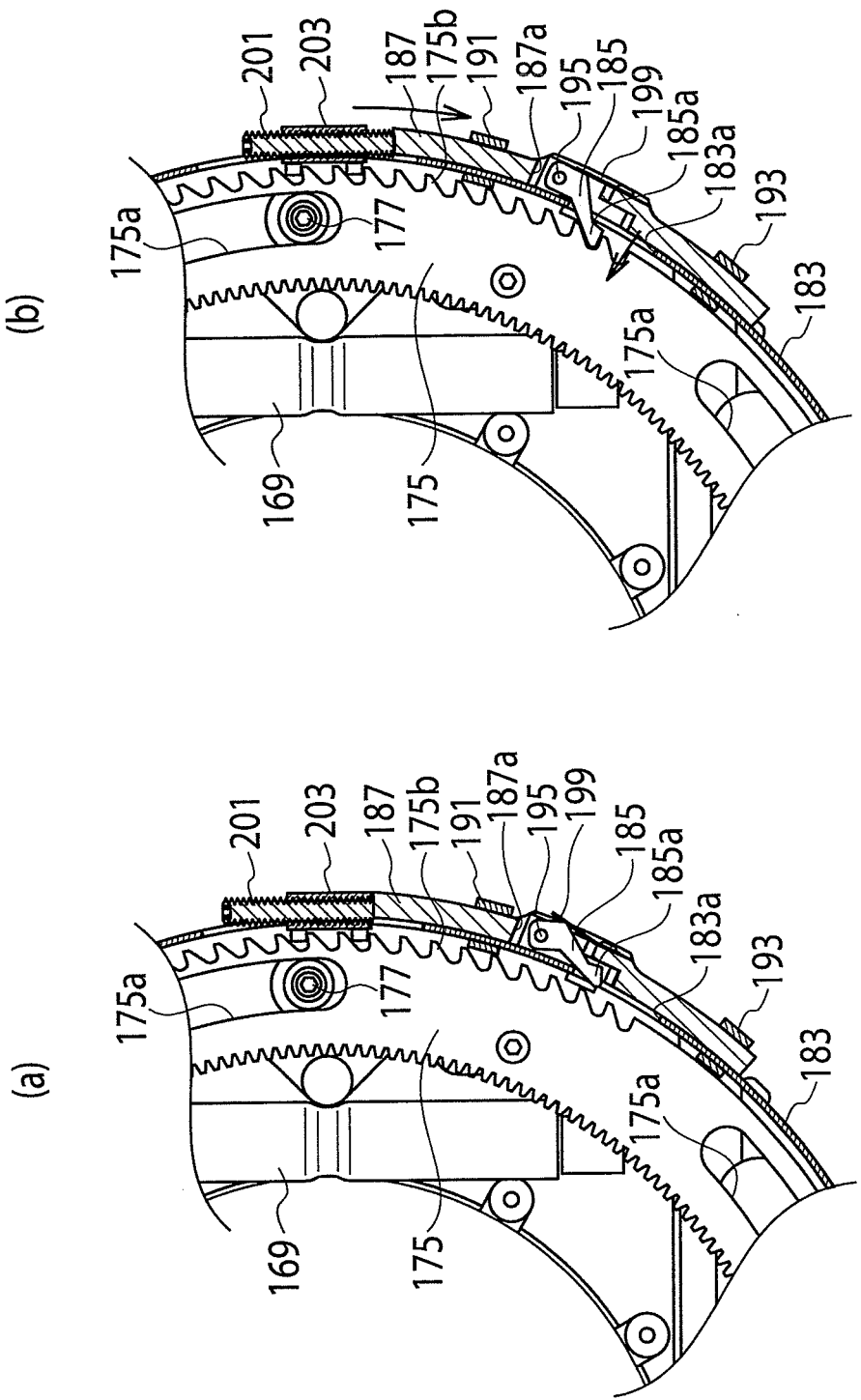
FIG. 13 It shows a lock mechanism indicated by XIII in FIG. 12, (a) is a front view (unlock state), and (b) is a front view (lock state).

In order to change the lock state (FIG. 13(*b*)) to the unlock state (FIG. 13(*a*)), the pusher screw 201 is loosened and then the slid bar 187 is pushed back upwardly. By these operations, the lock key 185 becomes contacted with the edge of the through hole 183*a* and is swung about the pin 195. As a result, the lock key 185 becomes disengaged from the external teeth 175*b* and thereby the unlock state (FIG. 13(*a*)) is brought.

Note that, as shown in FIG. 2, the support chuck module 39 having the above-explained configuration is rotatably supported by a support bracket 205. The support bracket 205 can be coupled with the X-axis carriage 15 having the work head 21 by a coupling mechanism (not shown). For example, the coupling mechanism may have a configuration in which a piston rod of a cylinder provided on the support chuck module 39 is protruded upward and then the piston rod is engaged with an engagement hole formed on the X-axis carriage 15.

Figure 14:
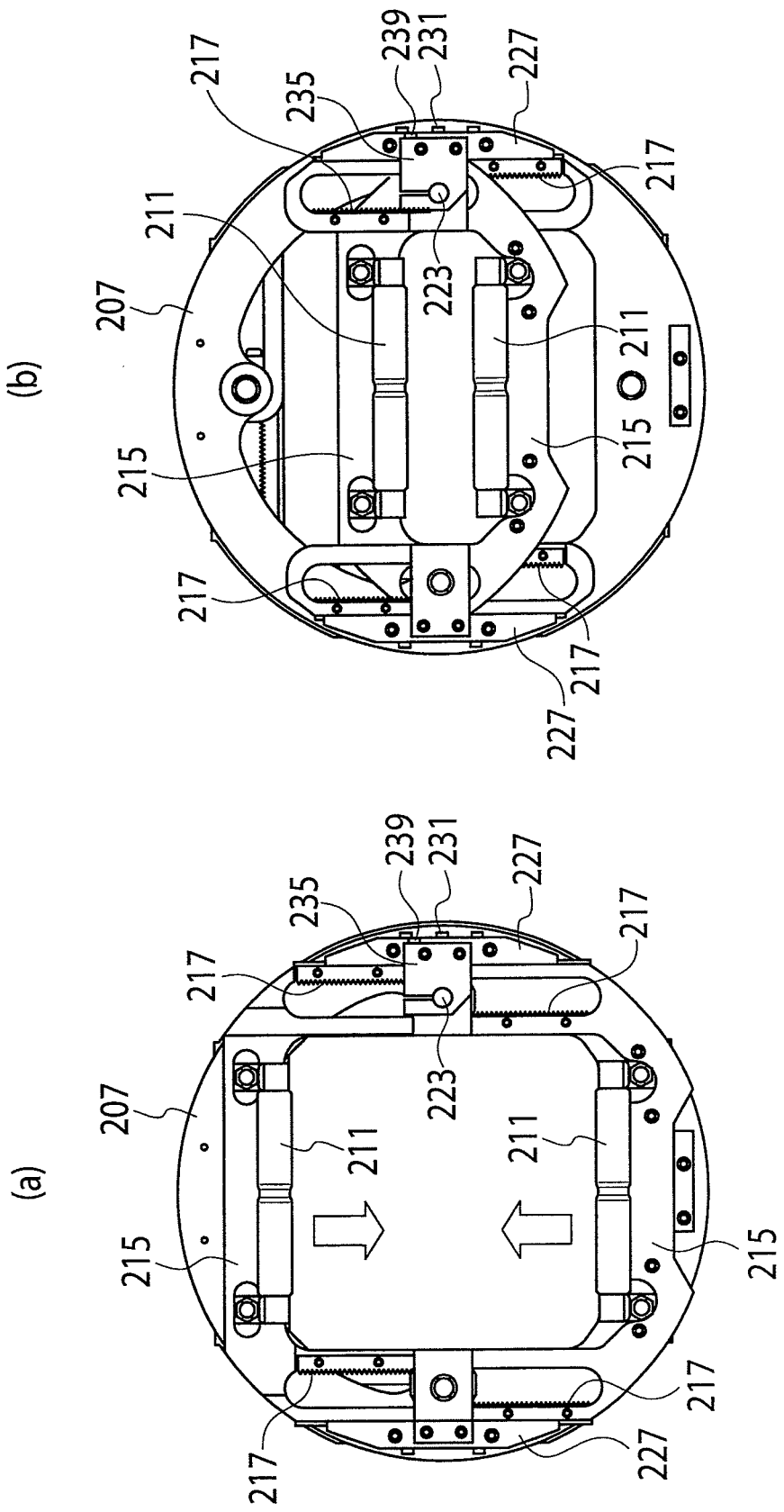
FIG. 14 It shows a product support module provided on the second palette, (a) is a front view (rollers are opened), and (b) is a front view (the rollers are closed).

Next, the product support module(s) 93 will be explained. The two product support modules 93 are aligned along the X-axis direction, and movable along the X-axis direction independently from each other. As shown in FIG. 14(*a*) and FIG. 14(*b*), the product support module(s) 93 includes a base plate 207 composed of a ring-shaped circular plate. A pair of vertically-movable upper/lower rollers 211 is provided on one surface of the base plate 207, and a pair of horizontally-movable left/right rollers (not shown) is provided on another surface of the base plate 207.

Similarly to the support chuck module 39, the upper/lower rollers 211 are rotatably attached to U-shaped movable plates 215 opposed to each other. Rack gears 217 provided on the movable plates 215 mesh with pinion gears (not shown), respectively. The right/left rollers are also provided similarly to a state of the upper/lower rollers 211 rotated by 90 degrees. Therefore, the pair of upper/lower rollers 211 is moved in opposite vertical directions to each other by rotating a handle 223 coaxial with one of the two pinion gears associated with the upper/lower rollers 211 (e.g. the pinion gear on a right side in FIG. 14(*a*) or FIG. 14(*b*)). Similarly, the pair of right/left rollers is also moved in opposite horizontal directions to each other by rotating a handle.

In a state where a product after worked (pipe) is held by the upper/lower rollers 211 and the right/left rollers, a pushing screw 231 provided on a guide member 227 for guiding the movable plates 217 is tightened up. As a result, an end of the pushing screw 231 becomes contacted with the movable plates 215 to restrict movements of the movable plates 215 and a held state of the product is ensured. Alternatively, it may be done that a block 235 with a slit into which a shaft of the pinion gear is inserted is provided and the shaft of the pinion gear is locked by tightening a lock screw 239 provided on the block 235 to narrow the slit. A held state of the product is ensured according to this configuration.

Note that, as shown in FIG. 2, the product support module(s) 93 is rotatably supported by a support bracket 243, and moves along the X-axis direction on the second palette 5 together with the X-axis carriage 15. One end of a pipe is held by the main chuck module 37, and another end is held by the support chuck module 39. The product support module(s) holds a pipe (product) cut off by the work head 21 on a side of the other end of the pipe.

Since the two product support modules 93 can be moved independently from each other, they can hold even a long product stably by a wide interval. Note that the two product support modules 93 may be integrated (e.g. coupled with an interval). In addition, the upper/lower rollers 211 and the right/left rollers can be moved independently from each other, they can surely hold even a work whose horizontal and vertical dimensions are different from each other.

Hereinafter, operations of the laser processing machine will be explained. First, a processing of a flat plate (plate-like work) using the first palette 3 will be explained. The second palette 5 shown in FIG. 1 and FIG. 2 is evacuated to the supplemental frame 13 as shown in FIG. 4(*a*). The flat plate is set onto the first palette 3 located at the carrying-out/in frame 11 shown in FIG. 1, and then the first palette 3 is moved to the work area 7 by driving of a motor and fixed.

In this state, the Y-axis carriage 23 having the work head 21 is moved long the X-axis carriage 15 in the Y-axis direction, and the X-axis carriage 15 is moved along the main frame 9 in the X-axis direction. By these operations, the work head 21 is moved to a previously-programmed work position over the flat plate, and a laser processing is done. The first palette 3 is returned to the carrying-put/in frame 11 by the motor together with the worked flat plate, and then the worked flat plate is carried out from the first palette 3.

Figure 17:
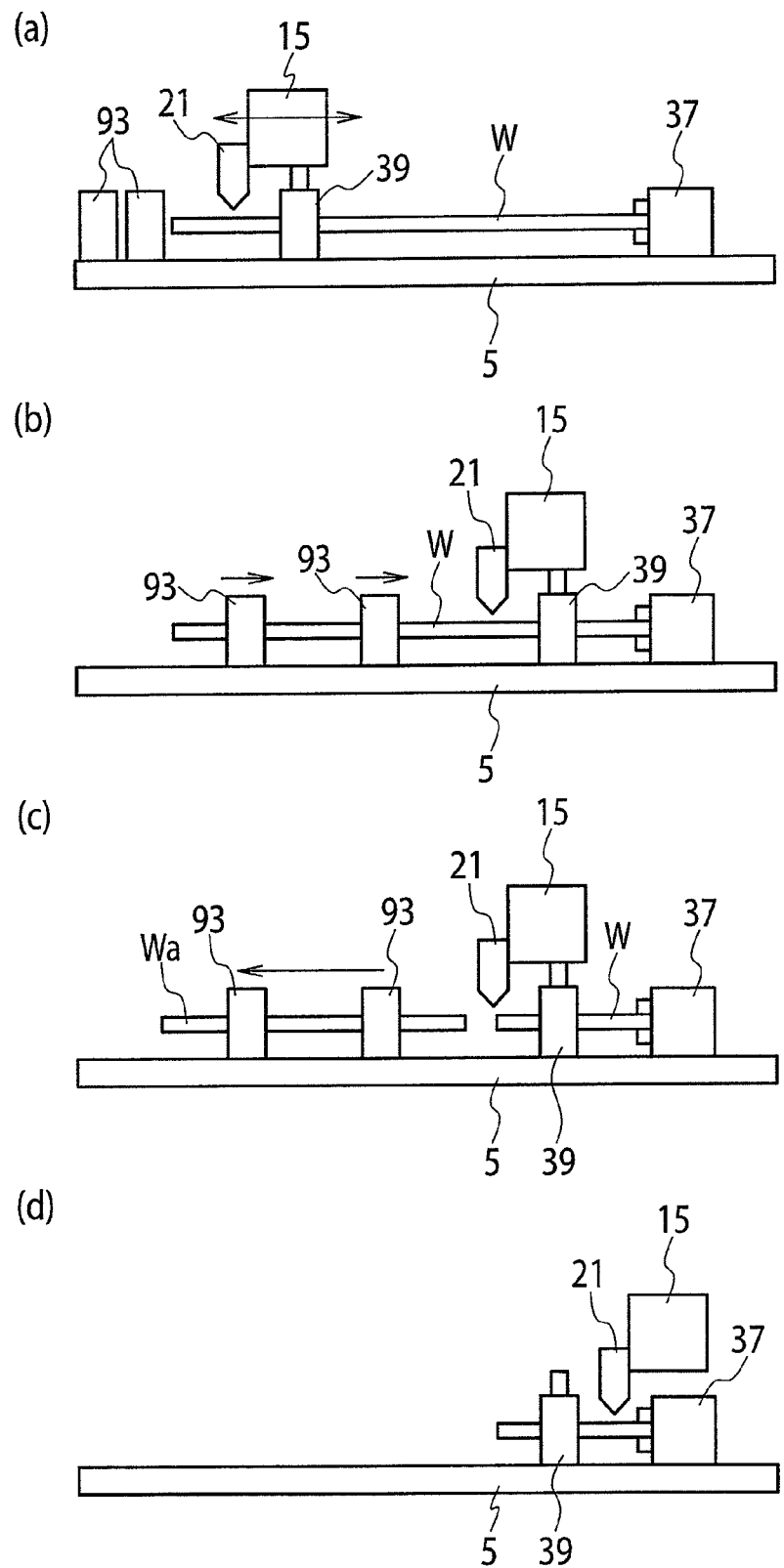
FIG. 17 It shows a processing method of a pipe according to the laser processing machine, (a) is a side view showing a state of a working initial stage, (b) is a side view showing a state just before cutting a pipe, (c) is a side view showing a state where the pipe has been cut, and (d) is a side view showing a state of uncoupling the X-axis carriage and the support chuck module.

Next, a processing of a pipe (rod-like work) using the second palette 5 will be explained. The first palette 3 shown in FIG. 1 and FIG. 17 is evacuated to the carrying-out/in frame 11 as shown in FIG. 4(*a*). From a state shown in FIG. 4(*a*), the second palette 5 is moved to the work area 7 in the main frame 9 and then fixed.

When moving the second palette 5 to the work area 7, the roller 41 on the second palette 5 shown in FIG. 3 is moved upward by the elevating cylinder 49 first, and coupled with the concave portion 43*a* of the coupling block 43 on the X-axis carriage 15. During this operation, the X-axis carriage 15 stayed at the escape area 17 as shown in FIG. 4(*a*), and then the second palette 5 is moved to the work area 7 as shown in FIG. 4(*b*) by moving of the X-axis carriage 15 coupled with the second palette 5 to the work area 7.

Note that, when evacuating the second palette 5 from the work area to the supplemental frame 13 for a processing of a flat plate, the second palette 5 is coupled with the X-axis carriage 15, and then the second palette 5 is evacuated to the supplemental frame 13 by moving of the X-axis carriage 15.

Figure 5:
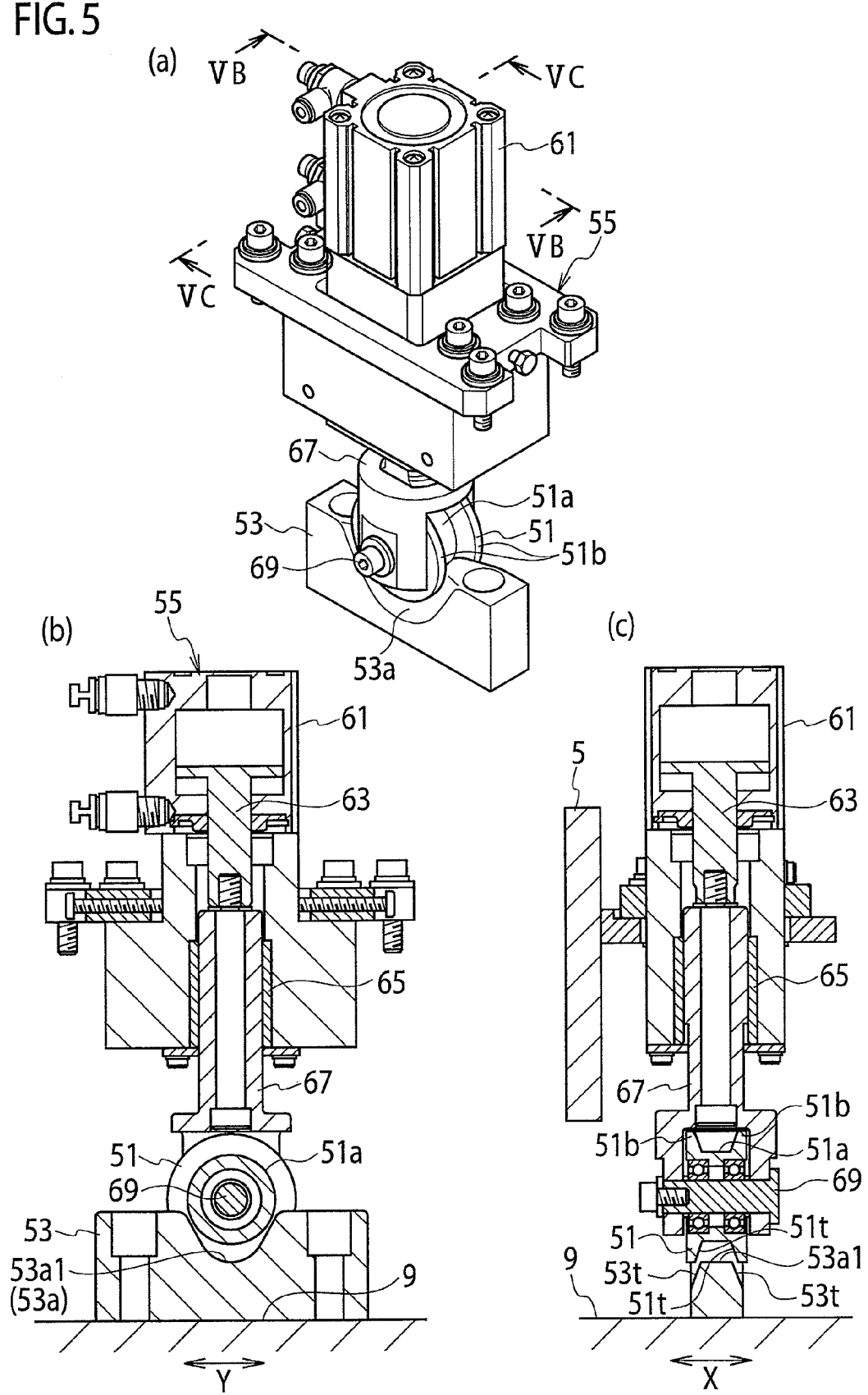
FIG. 5 It shows a first palette locking module for fixing the second palette with the work area, (a) is perspective view, (b) is a cross-sectional view taken along a line VB-VB in (a), and (c) is a cross-sectional view taken along a line VC-VC in (a).

In the second palette 5 moved to the work area 7, the positioning roller(s) 51 on the second palette 5 shown in FIG. 5 is moved downward by the lock cylinder(s) 61, and coupled with the concave portion(s) 53*a* of the fixing block(s) 53 on the main frame 9. Further, the locking roller(s) 73 of the locking lever(s) 71 shown in FIG. 6 is engaged with the locking block(s) 75 on the on the main frame 9 by the lock cylinder(s) 81.

In this manner, the second palette 5 is fixed with the main frame 9. After the second palette 5 is fixed, the roller 41 shown in FIG. 3 is moved downward by the elevating cylinder 49, and separated from the concave portion 43*a* of the coupling block 43. As a result, the X-axis carriage 15 becomes movable along the X-axis direction relatively to the main frame 9 and the second palette 5 fixed with the main frame 9.

Figure 15:
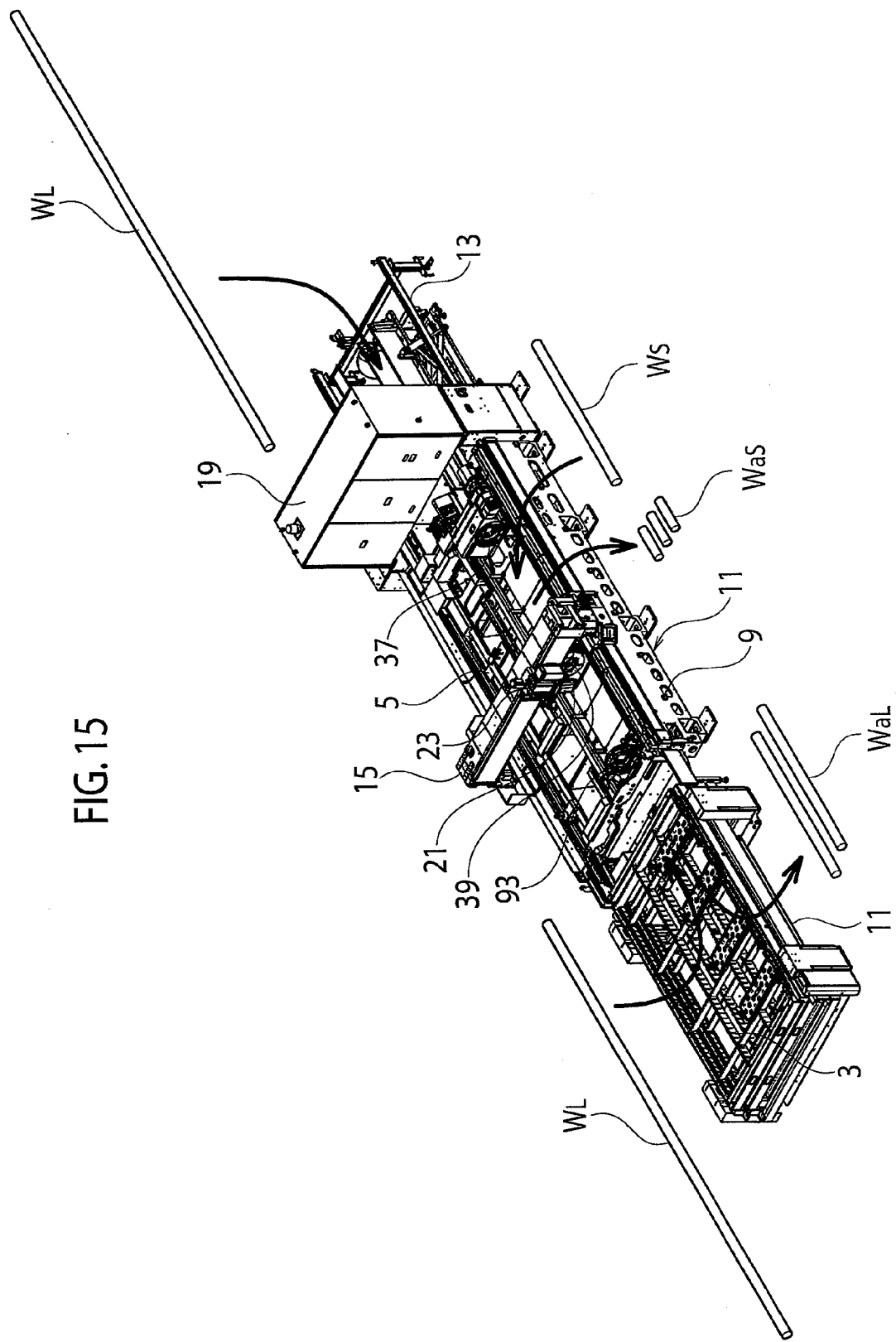
FIG. 15 It a perspective view showing supplying of a pipe (work) and carrying-out of processed pipes in the laser processing machine.

In this state, a pipe is set to the second palette 5. As shown in FIG. 15, a long pipe $W_L$ is hoisted up by a crane or the like, and then its one end is inserted into the main shaft 99 of the main chuck module 37 from a side of the supplemental frame 13. The pipe $W_L$ inserted into the main shaft 99 also inserted into the support chuck module 39 located at its insertion forward side. Depending on a length of the pipe $W_L$, it may be further inserted into the product support module(s) 93 located at its insertion forward side.

Figure 16:
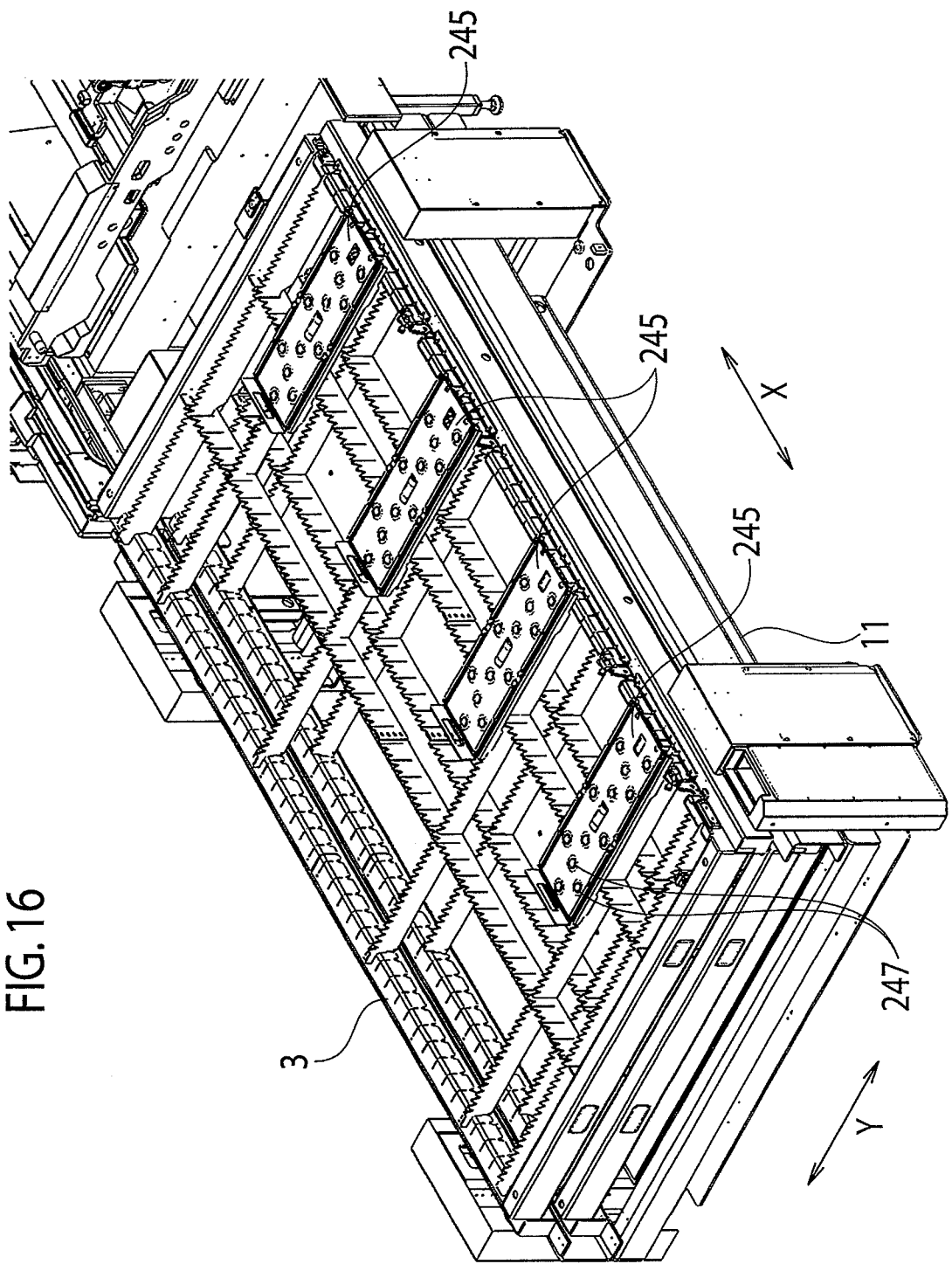
FIG. 16 It a perspective view showing carrying-in/out support plates on the first palette of a carrying-in/out frame in the laser processing machine.

Alternatively, a long pipe $W_L$ may be set from a side of the carrying-out/in frame 11. In this case, as shown in FIG. 16, carrying-out/in support plates 245 are put on the first palette 3 of the carrying-out/in frame 11. The carrying-out/in support plates 245 are aligned along the X-axis direction at intervals to be rectangles extending long in the Y-axis direction. On a surface of the carrying-out/in support plate(s) 245, rollers 247 each having a spherical shape, a cylindrical shape pr the like are provided rotatably. It is possible to move a pipe easily and smoothly by the rollers 147. The pipe $W_L$ is hoisted up by a crane or the like, and then placed on the carrying-out/in support plates 245. Then, the pipe $W_L$ is moved to the work area 7, and sequentially inserted into the product support module(s) 93, the support chuck module 39 and the main chuck module 37.

On the other hand, as shown in FIG. 15, a short pipe $W_S$ is carried into a space between the main chuck module 37 and the support chuck module 39 from the side of the main frame 9. One end of the pipe $W_S$ is inserted into one of the main chuck module 37 and the support chuck module 39, and another end of the pipe $W_S$ is inserted into another of the modules. When moving the support chuck module 39, the support chuck module 39 is disengaged from the X-Axis carriage 15.

FIG. 17(a) shows a state where a pipe W ($W_L$ or $W_S$) is inserted into the main chuck module 37 and the support chuck module 39. One end of the pipe W is held by the main chuck module 37, and another end is held by the support chuck module 39. In this state, the support chuck module 39 is coupled with the X-axis carriage 15.

When inserting the pipe W into the main shaft 99 of the main chuck module 37, the vertical jaws 101a vertically facing to each other is sufficiently distanced, and the horizontal jaws 101b horizontally facing to each other is also sufficiently distanced. In addition, the gear case 131 of the drive assembly 120 (see FIG. 7 and FIG. 9) is moved forward by the cylinder 137, and thereby the ring board drive gears 127 and 129 are meshed with the scroll ring boards 113 and 115, respectively. Further, the brake release bars 139 contact with the brake bars 143 by moving of the gear case 131, and then restriction of rotations of the scroll ring boards 113 and 115 by the brake pads 147 (see FIG. 10(b)) is cancelled.

The air motors 121 and 123 (see FIG. 9) are driven in this state, and thereby the scroll ring boards 113 and 115 are rotated via the pinion shafts 124 and 125 and the ring board drive gears 127 and 129. As a result, the four jaws 101 meshed with the spiral grooves 113a and 115a of the scroll ring boards 113 and 115 are moved in the diameter direction of the main shaft 99, and then hold the pipe W.

After holding the pipe W by the jaws 101, the gear case 131 is moved back by the cylinder 137, and thereby the ring board drive gears 127 and 129 are separated from the scroll ring boards 113 and 115, respectively. At the same time, the brake release bars 139 are separated from the brake levers 143, and thereby the brake levers 143 are returned to their initial positions by the compressed springs 148 (see FIG. 10(a)). As a result, the brake pads 147 are pressed onto the scroll ring boards 113 and 115 to restrict rotations of the scroll ring boards 113 and 115.

The restriction of rotations of the scroll ring boards 113 and 115 is done by the brake pads 147 provided on the jaw guide 113 located between the scroll ring boards 113 and 115. Therefore, the scroll ring boards 113 and 115 and the jaw guide 111 are unified during the restriction of rotations. As s result, when the main shaft 99 to which the jaw guide 11 is attached is rotated, the pipe W held by the jaws 101 is also rotated together with the scroll ring boards 113 and 115.

On the other hand, when inserting the pipe W into the support chuck module 39, the rollers 167 and 169 (first roller group) of the horizontal chuck 153 are distanced from each other as shown in FIG. 11(a), and the rollers (second roller group) of the vertical chuck 155 are also distanced from each other. In this state, the pinion gears 159 and 161 of the horizontal chuck 153 are rotated to move the rollers 167 and 169 close to each other, and the pinion gears of the vertical chuck 155 are also rotated to move the rollers of the vertical chuck 155 close to each other. As a result, the support chuck module 39 holds the inserted pipe W horizontally and vertically.

Note that the pipe W is held by the rotatable rollers 167 and 169 of the support chuck module 39. Therefore, the rollers 167 and 169 is rotated when the X-axis carriage 15 is moved along the X-axis direction, the support chuck module 39 coupled with the X-axis carriage 15 can be also moved along the X-axis direction while holding the pipe W.

The main shaft 99 is rotated by the servomotor 107 (see FIG. 7) in a state where the pipe W is held by the main chuck module 37 and the support chuck module 39 as explained above, and thereby the pipe W is also rotated together with rotation of the main shaft.

When processing, by the work head 21, the pipe W held by the main chuck module 37 and the support chuck module 39, it is processed from a side opposite to the main chuck module 37 as shown in FIG. 17(a). For example, in a case where the pipe W is to be processed along its circumferential direction, the pipe W is processed while being rotated by the servomotor 107 (see FIG. 7) of the main chuck module 37. Then, as shown in FIG. 17(b), the X-axis carriage 15 is moved toward the main chuck module 37, and then a previously-programmed position of the pipe W is processed.

When the X-axis carriage 15 reaches to a vicinity of the main chuck module 37 and the processing is coming to an end, the product support modules 93 are manually moved toward the X-Axis carriage 15 as shown in FIG. 17(b) and then the pipe W is held by the product support modules 93. At this time, the upper/lower rollers 211 (see FIG. 14(a)) are moved close to each other and the right/left rollers are also moved close to each other, and then the pipe W is held by the rollers 211.

The pipe is cut off by the work head 21 by rotating the pipe W by the servomotor 107 in a state shown in FIG. 17(b). A state after the cutoff is shown in FIG. 17(c). A cut-off pipe (product) Wa is manually moved in a held state by the product support modules 93 to be distanced from the X-axis carriage 15.

Subsequently, holding by the product support modules 93 is cancelled, a long product(s) $Wa_L$ is carried out onto the carrying-out/in support plates 245 on the first palette 3 (see FIG. 16) as shown in FIG. 15, and then carried out of the machine by a crane or the like. On the other hand, a short product(s) $Wa_S$ is carried out from the main frame 9 as shown in FIG. 15.

In addition, in a case where the pipe W is to be further cut from a state shown in FIG. 17(c), coupling between the X-axis carriage 15 and the support chuck module 39 is decoupled as shown in FIG. 17(*d*), and then the pipe W is cut after moving the X-axis carriage 15 (work head 21) close to the main chuck module 37. By this operation, an unworkable area of the pipe can be made minimum.

Note that a rod-like work workable in the present embodiment may be a steel beam such as an H-beam and an angled beam in addition to a circular pipe and a rectangular pipe. In addition, even in a case to hold a rod-like work with different cross-sectional height and width dimensions such as an elongated rectangular pipe and a C-beam, the rod-like work with the different cross-sectional dimensions can be held without problems because the vertical jaws 101*a* and the horizontal jaws 101*b* of the main chuck module 37 and the upper/lower rollers 211 and the right/left rollers of the support chuck module 39 can be moved independently from each other, respectively.

In addition, according to the present embodiment, when switching over between a processing of a plate-like work and a processing of a rod-like work, it is needed only to move/evacuate the first palette 3 on which the plate-like work is placed and the second palette 5 including the rod-like work holder (the main chuck module 37 and the support chuck module 39) to/from the work area 7, so that the switching-over operation can be easily done.

In addition, in the present embodiment, the main chuck module 37 and the support chuck module 39 are provided with the insertion holes 99*a* and 190 into which a pipe W can be inserted along a movable direction of the palette(s), respectively. Therefore, by inserting a pipe W into the insertion hole 99*a* of the main chuck module 37 or into the insertion hole 190 of the support chuck module 39 along the movable direction when setting the pipe W to the second palette 5, even a long work can be easily set.

In addition, in the present embodiment, the rod-like holder includes the first holder (main chuck module 37) for holding an end of a pipe W and the second holder (support chuck module 39) movable along the movable direction relatively to the second palette 5. Therefore, the laser processing machine according to the present embodiment can hold even a long pipe stably, so that processing accuracy can be improved.

In addition, in the present embodiment, the second holder (support chuck module 39) can be moved integrally with the work head 21 even when a rod-like work is fixed in the movable direction. Therefore, a processing by the work head 21 can be always done near a holding position by the support chuck module, so that processing accuracy can be improved.

In addition, in the present embodiment, the second palette 5 can be moved along the movable direction by the drive source of the X-axis carriage 15 in a state where it is coupled with the X-axis carriage 15. Therefore, it is not needed to prepare a drive source only for the second palette 5, so that equipment configurations can be simplified and costs for equipments can be reduced.

In addition, in the present embodiment, the first palette 3 includes the carrying-out/in support plate(s) 245 for receiving a rod-like work (pipe) processed on the second palette 5 located at the work area 7. Therefore, the rod-like work can be kept by the carrying-out/in support plate(s) 245 even when the first palette 3 exists upon moving the processed rod-like work to the carrying-out/in frame 11.

The invention claimed is:

1. A laser processing machine comprising:
a work head;
a plate-like work working table for processing a plate-like work;
a rod-like work working table including a rod-like work holder for processing a rod-like work; and
a work area in which the work head is movably provided, wherein
the plate-like work working table is provided movably from one side of the work area into the work area, and
the rod-like work working table is provided movably from another side of the work area into the work area, the other side being opposite side of the one side.

2. The laser processing machine according to claim 1, wherein
the rod-like work holder is provided with a rod-like work insertion hole into which the rod-like work can be inserted along a movable direction of the rod-like work working table.

3. The laser processing machine according to claim 1 or 2, wherein
the rod-like work holder includes a first holder for holding the rod-like work, and a second holder movable on the rod-like work working table along a movable direction of the rod-like work working table.

4. The laser processing machine according to claim 3, wherein
the second holder is configured to be movable integrally with the work head along the movable direction.

5. The laser processing machine according to claim 1, wherein
the work head is supported by a head support portion movable along a movable direction of the rod-like work working table, and
the rod-like work working table is configured to be coupled with the head support portion, and is moved by a drive source of the head support portion when moved along the movable direction in a state where coupled with the head support portion.

6. The laser processing machine according to claim 1, wherein
the plate-like work working table includes a carrying-out/in support plate for carrying-out/in the rod-like work from/to the rod-like work working table located at the work area.

7. The laser processing machine according to claim 3, wherein
the first holder is configured to hold the rod-like work fixedly and be rotatable together with the rod-like work held fixedly, and
the second holder is configured to hold the rod-like work slidably in the movable direction.

8. The laser processing machine according to claim 7, wherein
the second holder includes a first roller group including two rollers that are oppositely disposed so that a distance to each other can be changed, and a second roller group including two rollers that are oppositely disposed so that a distance to each other can be changed, and
an opposite direction of the rollers of the first roller group and an opposite direction of the rollers of the second roller group are perpendicular to each other.

9. A laser processing method, wherein
a plate-like work working table is provided movably from one side of an work area in which a work head is provided into the work area, and
a rod-like work working table including a rod-like work holder is provided movably from another side of the work area into the work area, the other side being opposite side of the one side, the method comprising;
when processing a rod-like work, evacuating the plate-like work working table outside the work area, and moving the rod-like work working table to the work area,
carrying-in the rod-like work on the rod-like work working table moved to the work area,
processing the rod-like work on the rod-like work working table, and
carrying-out the processed rod-like work to a carrying-out/in support plate placed on the plate-like work working table.

10. The laser processing method according to claim 9, wherein,
when processing a plate-like work, evacuating the rod-like work working table outside the work area, and moving the plate-like work working table to the work area,
carrying-in the plate-like work on the plate-like work working table moved to the work area, and
processing the plate-like work on the plate-like work working table.

\* \* \* \* \*

UNITED STATES PATENT AND TRADEMARK OFFICE
CERTIFICATE OF CORRECTION

| | |
|---|---|
| PATENT NO. | : 9,120,176 B2 |
| APPLICATION NO. | : 13/878579 |
| DATED | : September 1, 2015 |
| INVENTOR(S) | : Nishiyama et al. |

It is certified that error appears in the above-identified patent and that said Letters Patent is hereby corrected as shown below:

Column 16, line 16 claim 2, delete "or 2" before wherein.

Signed and Sealed this
Twelfth Day of April, 2016

Michelle K. Lee
*Director of the United States Patent and Trademark Office*